(12) United States Patent
Milstein et al.

(10) Patent No.: US 8,472,430 B2
(45) Date of Patent: Jun. 25, 2013

(54) VOIP PACKET PRIORITIZATION

(75) Inventors: David Milstein, Redmond, WA (US);
Linda Criddle, Kirkland, WA (US);
Scott Forbes, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1886 days.

(21) Appl. No.: 11/397,475

(22) Filed: Apr. 3, 2006

(65) Prior Publication Data
US 2007/0230443 A1    Oct. 4, 2007

(51) Int. Cl.
*H04L 12/66*    (2006.01)
*H04M 11/04*    (2006.01)
*H04M 3/42*    (2006.01)

(52) U.S. Cl.
USPC .......... 370/352; 379/37; 379/46; 379/215.01; 455/404.1

(58) Field of Classification Search
USPC ........ 370/352; 379/215.01, 37–51; 455/404.1
See application file for complete search history.

(56) References Cited

U.S. PATENT DOCUMENTS

| | | | |
|---|---|---|---|
| 5,956,681 A | 9/1999 | Yamakita | 704/260 |
| 6,069,940 A | 5/2000 | Carleton et al. | 379/88.04 |
| 6,097,288 A * | 8/2000 | Koeppe, Jr. | 340/517 |
| 6,249,765 B1 | 6/2001 | Adler et al. | 704/500 |
| 6,405,033 B1 * | 6/2002 | Kennedy et al. | 455/414.1 |
| 6,418,216 B1 * | 7/2002 | Harrison et al. | 379/208.01 |
| 6,442,250 B1 | 8/2002 | Troen-Krasnow et al. | 379/93.15 |
| 6,608,559 B1 | 8/2003 | Lemelson et al. | |
| 6,678,357 B2 | 1/2004 | Stumer et al. | 379/45 |
| 6,728,358 B2 | 4/2004 | Kwan | 379/202.01 |
| 6,771,742 B2 | 8/2004 | McCalmont et al. | 379/45 |
| 6,868,143 B1 | 3/2005 | Menon et al. | 379/88.13 |
| 6,904,132 B2 | 6/2005 | Reynolds | 379/88.16 |
| 6,925,487 B2 | 8/2005 | Kim | 709/203 |
| 7,027,564 B2 | 4/2006 | James et al. | 382/236 |
| 7,046,986 B2 * | 5/2006 | Amano et al. | 455/404.1 |
| 7,180,997 B2 | 2/2007 | Knappe | 379/387.01 |
| 7,251,313 B1 | 7/2007 | Miller et al. | 379/88.01 |

(Continued)

FOREIGN PATENT DOCUMENTS

EP    1 643 740    4/2006

OTHER PUBLICATIONS

Office Action mailed Jan. 21, 2010, in U.S. Appl. No. 11/444,633.
Office Action mailed Apr. 4, 2008, in U.S. Appl. No. 11/398,966.

(Continued)

*Primary Examiner* — Asad Nawaz
*Assistant Examiner* — Nicholas Jensen
(74) *Attorney, Agent, or Firm* — Merchant & Gould

(57) ABSTRACT

A method and system for prioritizing data packets relating to a conversation over a VoIP communication channel is provided. An individual client or a service provider may specify priority information corresponding to incoming conversations. When several calling clients send data packets to one called client, the predefine priority information of the called client may be exchanged as part of contextual information. Based on the predefined priority information, priority levels are assigned to the received data packets. Subsequently, an existing communication channel may be terminated, interrupted, altered, and/or suspended in order to transmit data packets with higher priority than other data packets. A new communication channel may be established for a two-way communication, or a one-way communication between two clients. In this manner, the highest priority conversation among several incoming conversations, such as an emergency broadcast message or communication, can be ensured to reach to a client without a delay.

20 Claims, 19 Drawing Sheets

U.S. PATENT DOCUMENTS

| | | | | |
|---|---|---|---|---|
| 7,359,493 | B1 | 4/2008 | Wang et al. | 379/88.23 |
| 7,469,041 | B2 | 12/2008 | Cragun | 379/92.01 |
| 7,627,305 | B2 | 12/2009 | Helferich | |
| 7,697,511 | B2 | 4/2010 | Milstein et al. | 370/352 |
| 8,280,015 | B2 | 10/2012 | Milstein et al. | |
| 2002/0062310 | A1 | 5/2002 | Marmor et al. | 707/3 |
| 2002/0110226 | A1 | 8/2002 | Kovales et al. | 379/88.17 |
| 2002/0124057 | A1 | 9/2002 | Besprosvan | 709/219 |
| 2002/0196910 | A1 | 12/2002 | Horvath et al. | 379/88.01 |
| 2003/0143974 | A1* | 7/2003 | Navarro | 455/404 |
| 2003/0162557 | A1 | 8/2003 | Shida | 455/521 |
| 2004/0052218 | A1* | 3/2004 | Knappe | 370/260 |
| 2005/0003797 | A1 | 1/2005 | Baldwin | 455/404.1 |
| 2005/0030977 | A1* | 2/2005 | Casey et al. | 370/485 |
| 2005/0037739 | A1 | 2/2005 | Zhong | |
| 2005/0062844 | A1 | 3/2005 | Ferren et al. | 348/14.08 |
| 2005/0090225 | A1 | 4/2005 | Muehleisenm et al. | 455/404.1 |
| 2005/0162267 | A1 | 7/2005 | Khandelwal et al. | 340/506 |
| 2005/0164681 | A1 | 7/2005 | Jenkins et al. | 455/412.1 |
| 2005/0176451 | A1 | 8/2005 | Helferich | |
| 2005/0198143 | A1 | 9/2005 | Moody et al. | 709/206 |
| 2005/0213565 | A1 | 9/2005 | Barclay et al. | 370/352 |
| 2005/0213716 | A1 | 9/2005 | Zhu et al. | 379/45 |
| 2005/0281284 | A1 | 12/2005 | Shim et al. | 370/465 |
| 2006/0018305 | A1 | 1/2006 | Cope | 370/352 |
| 2006/0059495 | A1 | 3/2006 | Spector | 719/310 |
| 2006/0067308 | A1 | 3/2006 | Cho | 370/352 |
| 2006/0072547 | A1 | 4/2006 | Florkey et al. | 370/352 |
| 2006/0229093 | A1 | 10/2006 | Bhutiani et al. | 455/518 |
| 2007/0115923 | A1 | 5/2007 | Denny et al. | 370/352 |
| 2007/0127633 | A1 | 6/2007 | Hertel et al. | 379/67.1 |
| 2007/0195735 | A1 | 8/2007 | Rosen et al. | 370/335 |
| 2007/0201376 | A1 | 8/2007 | Marshall-Wilson | 370/252 |
| 2007/0230443 | A1 | 10/2007 | Milstein et al. | 370/352 |
| 2007/0237130 | A1 | 10/2007 | Milstein et al. | 370/352 |
| 2007/0237138 | A1 | 10/2007 | Milstein et al. | 370/389 |
| 2007/0280433 | A1 | 12/2007 | Milstein et al. | 379/67.1 |
| 2008/0003941 | A1 | 1/2008 | Milstein et al. | 455/3.01 |
| 2008/0037723 | A1 | 2/2008 | Milstein et al. | 379/88.12 |
| 2008/0069006 | A1 | 3/2008 | Walter et al. | 370/252 |
| 2009/0100009 | A1 | 4/2009 | Karp | 707/3 |
| 2009/0180596 | A1 | 7/2009 | Reynolds et al. | 379/48 |

OTHER PUBLICATIONS

Office Action mailed Nov. 12, 2008, in U.S. Appl. No. 11/398,966.
Office Action mailed Jul. 12, 2010, in U.S. Appl. No. 11/480,660; 18 pgs.
Office Action mailed Sep. 15, 2010, in U.S. Appl. No. 11/480,752.
Lookabaugh, T., et al.; "A Model for Emergency Service of VoIP Through Certification and Labeling," Federal Communications Law Journal 58(1):115-167, 2006.
Mintz-Habib, M., et al., "A VoIP Emergency Services Architecture and Prototype," Proceedings of IEEE In't Conference on Computer Communications and Networks, San Diego, CA, Oct. 17-19, 2005, pp. 523-528.
TCN Users' Manual [online], uploaded on Oct. 5, 2004; http://www.scmaonline.net/test/Linnie%20Files/Users'%20Manual.TCN.doc, retrieved Apr. 18, 2006.
Office Action mailed Jul. 2, 2010, in U.S. Appl. No. 11/444,633.
Office Action mailed Feb. 11, 2011, in U.S. Appl. No. 11/480,660.
Office Action mailed Feb. 18, 2011, in U.S. Appl. No. 11/480,752.
U.S. Appl. No. 13/601,791 entitled "Providing Contextual Information With a Voicemail Message" filed Aug. 31, 2012.
Office Action mailed Oct. 11, 2012, in U.S. Appl. No. 11/480,752.
Office Action mailed Nov. 28, 2012, in U.S. Appl. No. 13/601,791.
Office Action mailed Feb. 6, 2012, in U.S. Appl. No. 11/398,816.
Office Action mailed Mar. 28, 2012, in U.S. Appl. No. 11/480,752.
Office Action mailed Apr. 23, 2012, in U.S. Appl. No. 11/444,633.
Office Action mailed Sep. 28, 2011, in U.S. Appl. No. 11/398,816.
Office Action mailed Oct. 12, 2011, in U.S. Appl. No. 11/480,752.
Office Action mailed May 16, 2001, in U.S. Appl. No. 11/398,816.

* cited by examiner

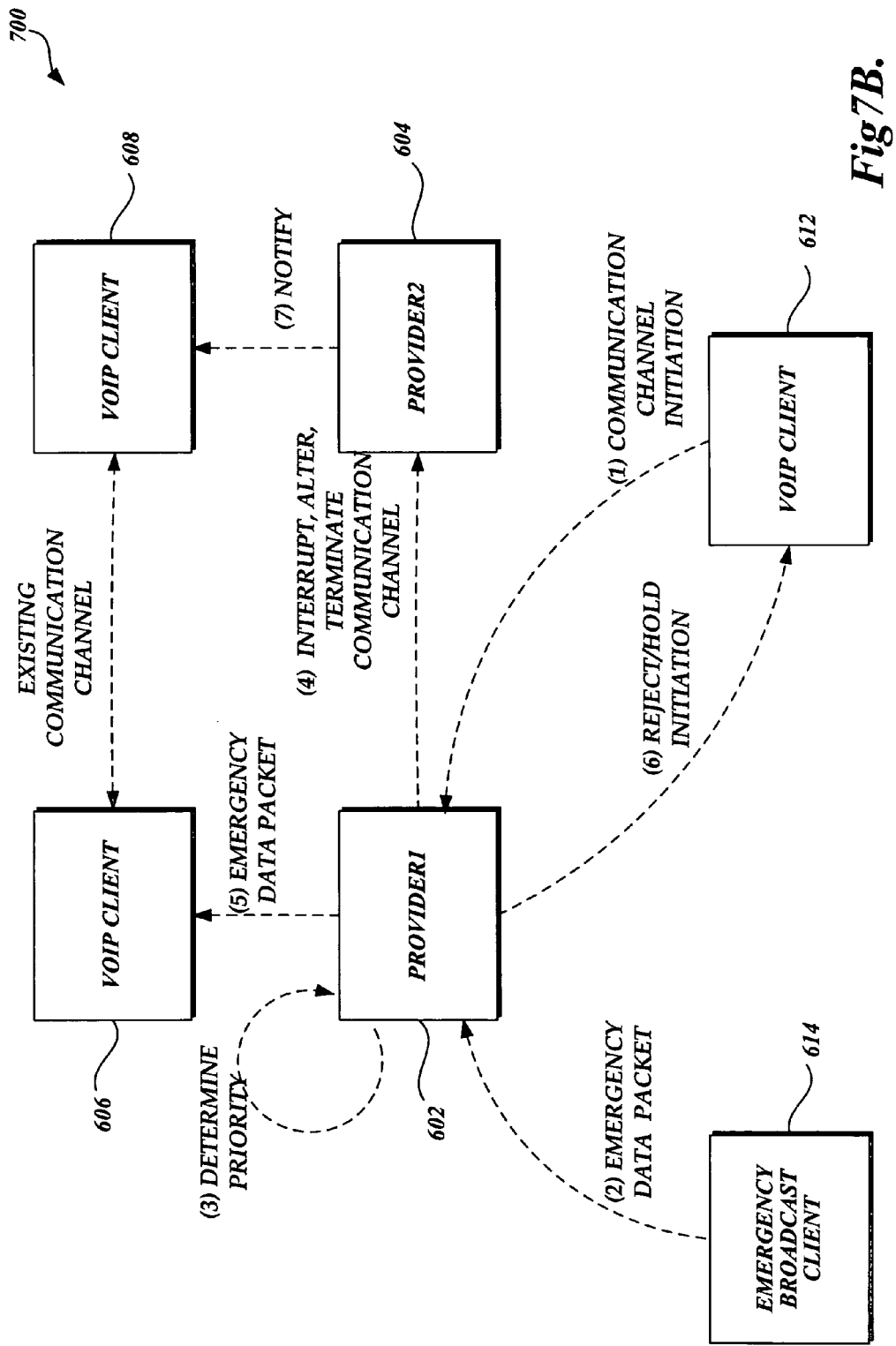

VOIP PACKET PRIORITIZATION

BACKGROUND

Generally described, an Internet telephony system provides an opportunity for users to have a call connection with enhanced calling features compared to a conventional Public Switched Telephone Network (PSTN)-based telephony system. In a typical Internet telephony system, often referred to as Voice over Internet Protocol (VoIP), audio information is processed into a sequence of data blocks, called packets, for communications utilizing an Internet Protocol (IP) data network. During a VoIP call conversation, the digitized voice is converted into small frames of voice data and a voice data packet is assembled by adding an IP header to the frame of voice data that is transmitted and received.

VoIP technology has been favored because of its flexibility and portability of communications, ability to establish and control multimedia communication, and the like. VoIP technology will likely continue to gain favor because of its ability to provide enhanced calling features and advanced services which the traditional telephony technology has not been able to provide. However, current VoIP approaches may not provide a systematic way for an authorized client to interrupt, terminate, or alter a call in order to transmit urgent information to clients.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A method and system for prioritizing data packets relating to a conversation over a communication channel is provided. An individual client or a service provider may specify priority information corresponding to incoming conversations. When several calling clients send data packets to one called client, the predefine priority information of the called client may be exchanged, among clients, service providers, and/or third party service providers, as part of contextual information. Based on the predefined priority information, priority levels are assigned to the received data packets. Subsequently, an existing communication channel may be terminated, interrupted, altered, and/or suspended in order to transmit data packets with higher priority than other data packets. A new communication channel may be established for a two-way communication, or a one-way communication between two VoIP clients after the existing communication channel is terminated, interrupted, altered, and/or suspended. In this manner, the highest priority VoIP conversation among several incoming or concurrent VoIP conversations, such as an emergency broadcast message, or communication, can be ensured to reach to a VoIP client without a delay.

In accordance with an aspect of the invention, a method for transmitting data packets based on predefined priorities is provided. A data packet is received for an existing communication channel between a first client and the second client. Another data packet is received from a third client who does not have any existing communication channel with the first client. Priority information specified by the first client is obtained for use in determining the priority level of the received data packets. Based on the priority information, a priority level is determined for the data packet of the second client and the data packet of the third client respectively. The data packet with a highest priority level is transmitted to the first client.

In accordance with the method, the obtained priority information may include priority information corresponding to the second client and the third client. When the third client is an emergency broadcast client and the second client has a lower priority level than the third client, the existing communication channel between the first client and the second client may be terminated, interrupted, altered, and/or suspended. When the third client is an emergency broadcast client but the second client has a higher priority level than the third client, it is determined whether the first client has indicated to ignore the priority level of the second client upon receipt of the data packet from the third client. If the first client has indicated to ignore the priority level of the second client, the existing communication channel between the first client and the second client may be interrupted and a higher priority level is assigned to the data packet received from the third client than the data packet received from the second client. Otherwise, the existing channel connection may be maintained between the first client and the second client and the first client will be notified about the data packet received from the third client.

In accordance with an aspect of the method, when the third client is a caller requesting to initiate a communication channel with the first client, the priority level of each calling client is compared. If the third client has a higher priority level than the second client, the existing communication channel between the first client and the second client is terminated and a communication channel between the first client and the third client is established. Alternatively, the existing communication channel between the first client and the second client is interrupted for a predetermined time period and a communication channel connection is established between the first and the third client. In one embodiment, the existing communication channel between the first client and the second client will be terminated after the predetermined time period expires.

In accordance with another aspect of the present invention, a computer-readable medium having computer-executable components for transmitting data packets with different priority levels over a communication channel is provided. The data packets are received from at least two sending clients. The computer-executable components include a channel managing component for terminating or interrupting an existing communication channel and establishing a new communication channel after the existing communication channel is terminated, interrupted, altered, and/or suspended. The computer-executable components further include a data packet transmitting component for assigning a priority level to each data packet and transmitting the data packets in an order of the assigned priority levels. The channel managing component establishes the new communication channel between the receiving client and one of the at least two sending clients with highest priority. The computer-executable components further include a data storage component for queuing a second set of data packets from a second emergency broadcast client for a delayed transmission while a first set of data packets from a first emergency broadcast client being transmitted when the first set of data packets has a higher priority level than the second set of data packets.

In accordance with yet another aspect of the present invention, a method for determining an order of transmitting data packets from a plurality of sending parties to a receiving party is provided. Each sending party sends at least one data packet to the receiving party. A computing device obtains a priority list defining a priority level for each of the plurality of sending parties from the receiving party. The computing device further obtains additional priority information corresponding to at least one sending party. The computing device updates the priority list with the additional priority information. The computing device determines the order of transmitting the data packets by comparing priority levels of sending parties based on the updated priority list.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 7A-7C are block diagrams illustrative of interactions among VoIP entities in the VoIP environment utilizing data packet prioritization in accordance with an embodiment of the present invention;

DETAILED DESCRIPTION

Generally described, the present invention relates to a method and system for prioritizing data packets relating to a conversation over a communication channel. More specifically, the present invention relates to a method and system for transmitting data packets from highest priority calling client after interrupting and/or terminating an existing communication channel. An authorized service provider may maintain, interrupt and/or terminate existing communication channel in order to transmit high priority information to clients based on predefined priority information. The predefined priority information is exchanged as part of contextual information represented in accordance with "structured hierarchies."

"Structured hierarchies," as used herein, are predefined organizational structures for arranging contextual information to be exchanged between two or more VoIP devices. For example, structured hierarchies may be XML namespaces. Further, a VoIP conversation is a data stream of information related to a conversation, such as contextual information and voice information, exchanged over a conversation channel. Although the present invention will be described with relation to illustrative structured hierarchies and an illustrative IP telephony environment, one skilled in the relevant art will appreciate that the disclosed embodiments are illustrative in nature and should not be construed as limiting.

Figure 1:
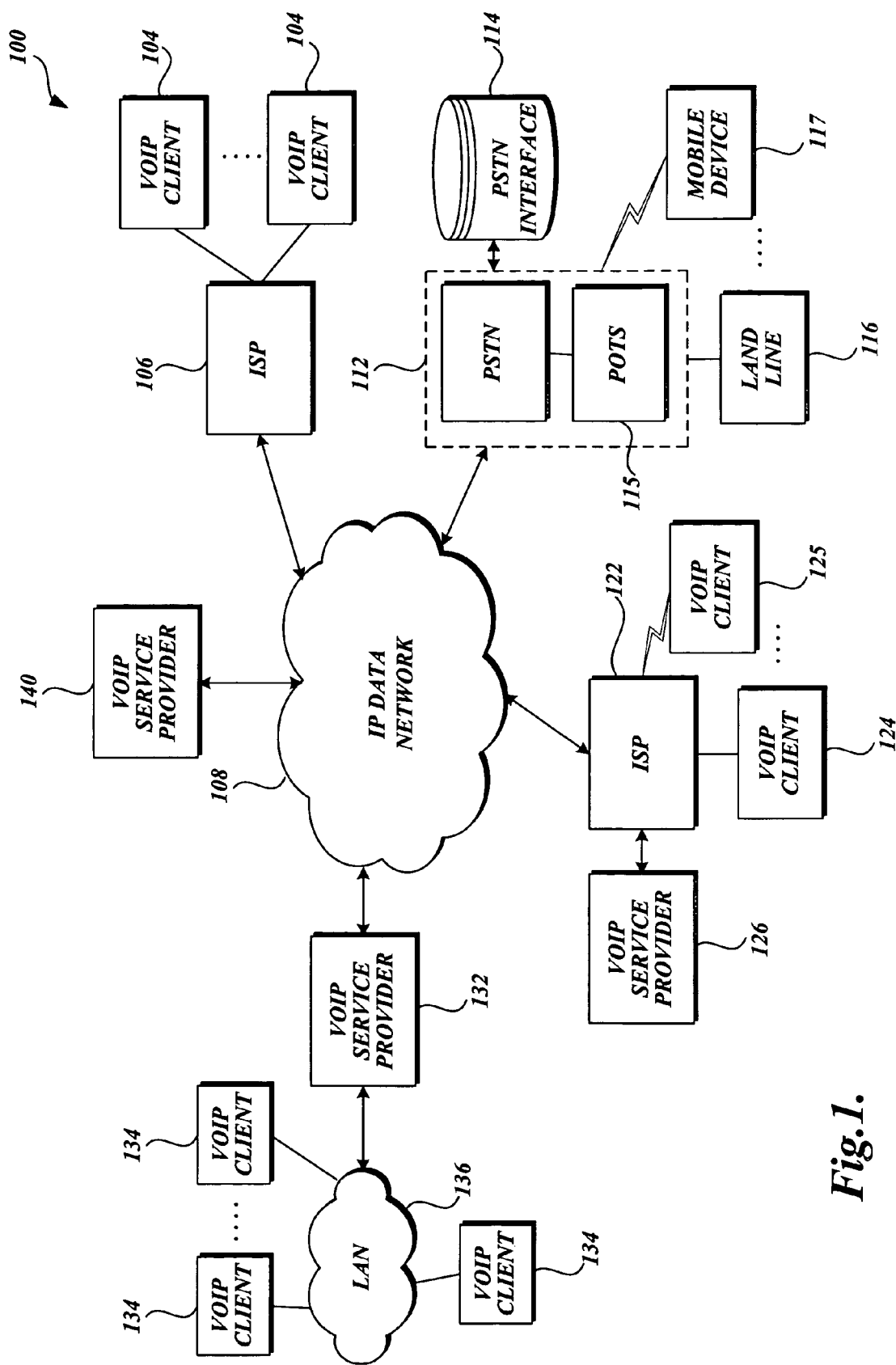
FIG. 1 is a block diagram illustrative of a VoIP environment for establishing a conversation channel between various clients in accordance with an aspect of the present invention.

With reference to FIG. 1, a block diagram of an IP telephony environment 100 for providing IP telephone services between various "VoIP clients" is shown. A "VoIP client," as used herein, refers to a particular contact point, such as an individual, an organization, a company, etc., one or more associated VoIP devices and a unique VoIP client identifier. For example, a single individual, five associated VoIP devices and a unique VoIP client identifier collectively makeup a VoIP client. Similarly, a company including five hundred individuals and over one thousand associated VoIP devices may also be collectively referred to as a VoIP client and that VoIP client may be identified by a unique VoIP client identifier. Moreover, VoIP devices may be associated with multiple VoIP clients. For example, a computer (a VoIP device) located in a residence in which three different individuals live, each individual associated with separate VoIP clients, may be associated with each of the three VoIP clients. Regardless of the combination of devices, the unique VoIP client identifier may be used within a voice system to reach the contact point of the VoIP client.

Generally described, the IP telephony environment 100 may include an IP data network 108 such as the Internet, an intranet network, a wide area network (WAN), a local area network (LAN) and the like. The IP telephony environment 100 may further include VoIP service providers 126, 132 providing VoIP services to VoIP clients 124, 125, 134. A VoIP call conversation may be exchanged as a stream of data packets corresponding to voice information, media information, and/or contextual information. As will be discussed in greater detail below, the contextual information includes metadata (information of information) relating to the VoIP conversation, the devices being used in the conversation, the contact point of the connected VoIP clients, and/or individuals that are identified by the contact point (e.g., employees of a company).

The IP telephony environment 100 may also include third party VoIP service providers 140. The VoIP service providers 126, 132, 140 may provide various calling features, such as incoming call-filtering, text data, voice and media data integration, and the integrated data transmission as part of a VoIP call conversation. VoIP clients 104, 124, 125, 136 may create, maintain, and provide information relating to predetermined priorities for incoming calls. In addition, the VoIP service providers 126, 132, 140 may also generate, maintain, and provide a separated set of priority information (e.g., provider priority list) for individuals communicating in a call conversation. The VoIP service providers 126, 132, 140 may determined and assign an appropriate priority level to data packets based on priority information provided by VoIP clients 104, 124, 125, 136 in conjunction with the provider priority list.

VoIP service providers 132 may be coupled to a private network such as a company LAN 136, providing IP telephone services (e.g., internal calls within the private network, external calls outside of the private network, and the like) and multimedia data services to several VoIP clients 134 communicatively connected to the company LAN 136. Similarly, VoIP service providers, such as VoIP service provider 126, may be coupled to Internet Service Provider (ISP) 122, providing IP telephone services and VoIP services for clients of the ISP 122.

In one embodiment, one or more ISPs 106, 122 may be configured to provide Internet access to VoIP clients 104, 124, 125 so that the VoIP clients 104, 124, 125 can maintain conversation channels established over the Internet. The VoIP clients 104, 124, 125 connected to the ISP 106, 122 may use wired and/or wireless communication lines. Further, each VoIP client 104, 124, 125, 134 can communicate with Plain Old Telephone Service (POTS) 115 communicatively connected to a PSTN 112. A PSTN interface 114 such as a PSTN gateway may provide access between PSTN and the IP data network 108. The PSTN interface 114 may translate VoIP data packets into circuit switched voice traffic for PSTN and vice versa. The PSTN 112 may include a land line device 116, a mobile device 117, and the like.

Conventional voice devices, such as land line 116 may request a connection with the VoIP client based on the unique VoIP identifier of that client and the appropriate VoIP device associated with the VoIP client, will be used to establish a connection. In one example, an individual associated with the VoIP client may specify which devices are to be used in connecting a call based on a variety of conditions (e.g., connection based on the calling party, the time of day, etc.).

It is understood that the above mentioned configuration in the environment 100 is merely exemplary. It will be appreciated by one of ordinary skill in the art that any suitable configurations with various VoIP entities can be part of the environment 100. For example, VoIP clients 134 coupled to LAN 136 may be able to communicate with other VoIP clients 104, 124, 125, 134 with or without VoIP service providers 132 or ISP 106, 122. Further, an ISP 106, 122 can also provide VoIP services to its client.

Figure 2:
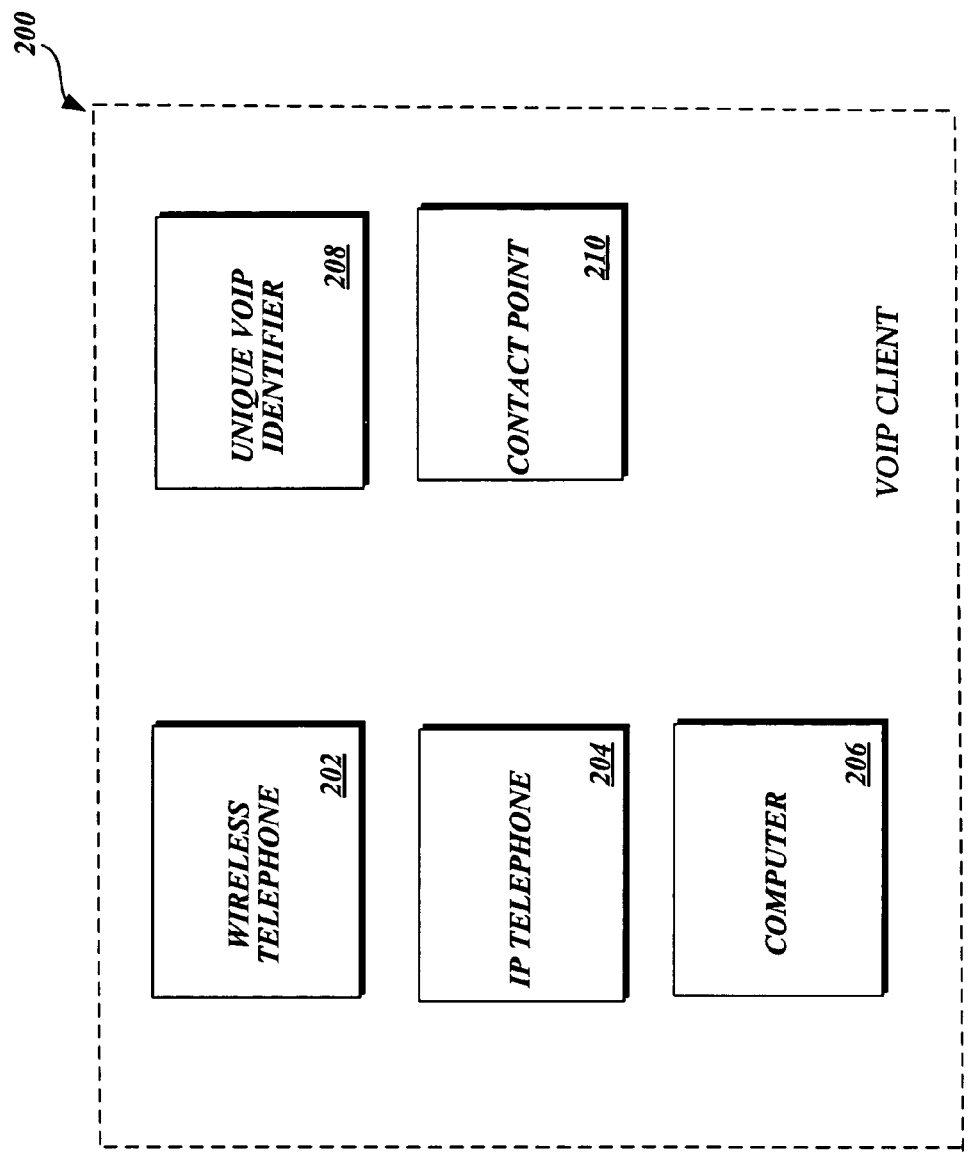
FIG. 2 is a block diagram illustrative of a VoIP client in accordance with an aspect of the present invention.

Referring now to FIG. 2, a block diagram illustrating an exemplary VoIP client 200 that includes several VoIP devices and a unique VoIP identifier, in accordance with an embodiment of the present invention, is shown. Each VoIP device 202, 204, 206 may include a storage that is used to maintain voice messages, address books, client specified rules, priority information related to incoming calls, etc. Alternatively, or in addition thereto, a separate storage, maintained for example by a service provider, may be associated with the VoIP client and accessible by each VoIP device that contains information relating to the VoIP client. In an embodiment, any suitable VoIP device such as a wireless phone 202, an IP phone 204, or a computer 206 with proper VoIP applications may be part of the VoIP client 200. The VoIP client 200 also maintains one or more unique VoIP identifier 208. The unique VoIP identifier(s) 208 may be constant or change over time. For example, the unique identifier(s) 208 may change with each call. The unique VoIP identifier is used to identify the client and to connect with the contact point 210 associated with the VoIP client. The unique VoIP identifier may be maintained on each VoIP device included in the VoIP client and/or maintained by a service provider that includes an association with each VoIP device included in the VoIP client. In the instance in which the unique VoIP identifier is maintained by a service provider, the service provider may include information about each associated VoIP device and knowledge as to which device(s) to connect for incoming communications. In alternative embodiment, the VoIP client 200 may maintain multiple VoIP identifiers. In this embodiment, a unique VoIP identifier may be temporarily assigned to the VoIP client 200 for each call session.

The unique VoIP identifier may be used similar to a telephone number in PSTN. However, instead of dialing a typical telephone number to ring a specific PSTN device, such as a home phone, the unique VoIP identifier is used to reach a contact point, such as an individual or company, which is associated with the VoIP client. Based on the arrangement of the client, the appropriate device(s) will be connected to reach the contact point. In one embodiment, each VoIP device included in the VoIP client may also have its own physical address in the network or a unique device number. For example, if an individual makes a phone call to a POTS client using a personal computer (VoIP device), the VoIP client identification number in conjunction with an IP address of the personal computer will eventually be converted into a telephone number recognizable in PSTN.

Figure 3:
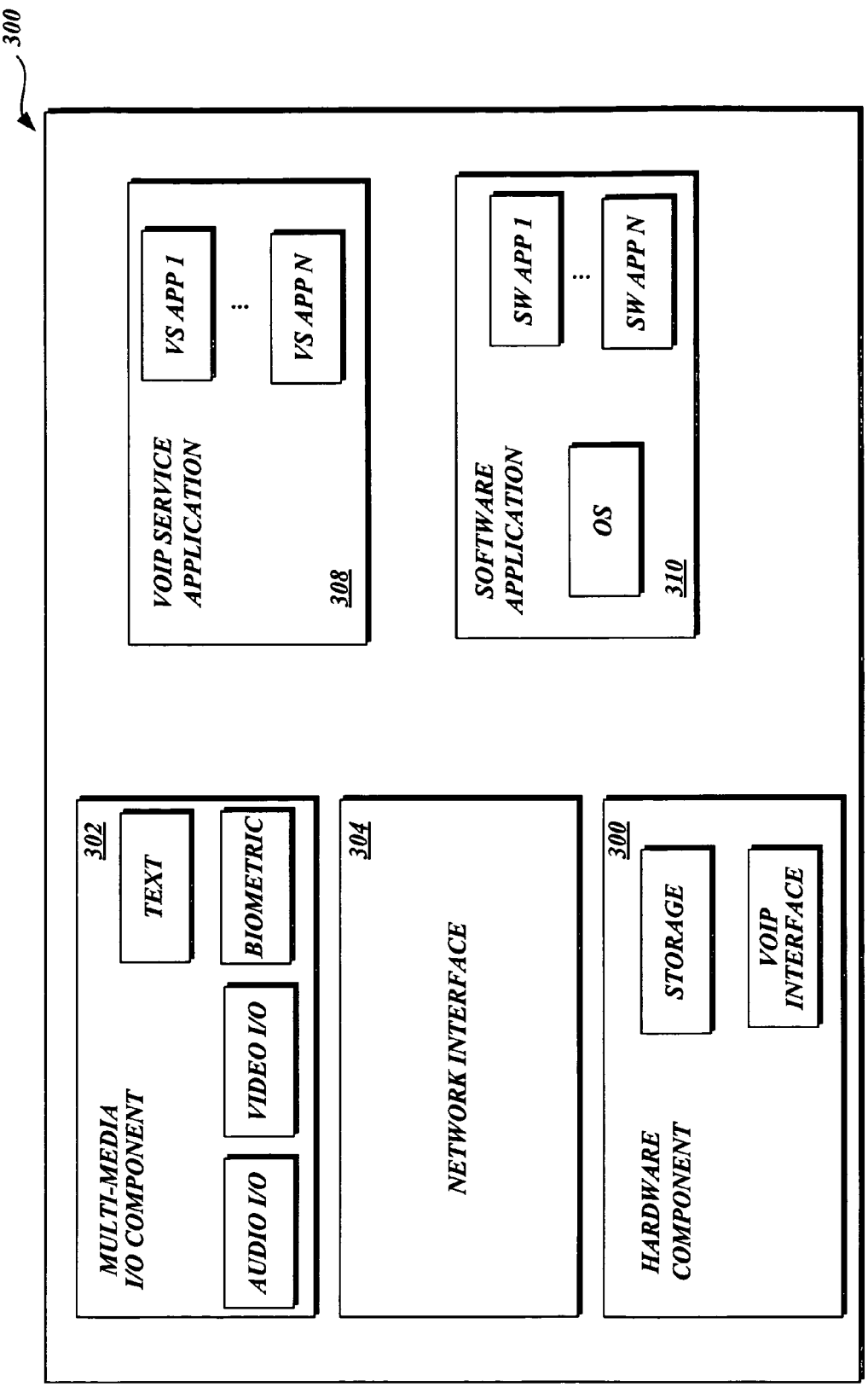
FIG. 3 is a block diagram illustrative of various components associated with a VoIP device in accordance with an aspect of the present invention.

FIG. 3 is a block diagram of a VoIP device 300 that may be associated with one or more VoIP clients and used with embodiments of the present invention. It is to be noted that the VoIP device 300 is described as an example. It will be appreciated that any suitable device with various other components can be used with embodiments of the present invention. For utilizing VoIP services, the VoIP device 300 may include components suitable for receiving, transmitting and processing various types of data packets. For example, the VoIP device 300 may include a multimedia input/output component 302 and a network interface component 304. The multimedia input/output component 302 may be configured to input and/or output multimedia data (including audio, video, and the like), user biometrics, text, application file data, etc. The multimedia input/output component 302 may include any suitable user input/output components such as a microphone, a video camera, a display screen, a keyboard, user biometric recognition devices and the like. The multimedia input/output component 302 may also receive and transmit multimedia data via the network interface component 304. The network interface component 304 may support interfaces such as Ethernet interfaces, frame relay interfaces, cable interfaces, DSL interfaces, token ring interfaces, radio frequency (air interfaces), and the like. The VoIP device 300 may comprise a hardware component 306 including permanent and/or removable storage such as read-only memory devices (ROM), random access memory (RAM), hard drives, optical drives, and the like. The storage may be configured to store program instructions for controlling the operation of an operating system and/or one or more applications and to store contextual information related to individuals (e.g., voice profiles, user biometrics information, etc.) associated with the VoIP client in which the device is included. In one embodiment, the hardware component 306 may include a VoIP interface card which allows non-VoIP client device to transmit and receive a VoIP conversation.

The device 300 may further include a software application component 310 for the operation of the device 300 and a VoIP Service application component 308 for supporting various VoIP services. The VoIP service application component 308 may include applications such as data packet assembler/disassembler applications, a structured hierarchy parsing application, audio Coder/Decoder (CODEC), video CODEC and other suitable applications for providing VoIP services. The CODEC may use voice profiles to filter and improve incoming audio.

Figure 4A:
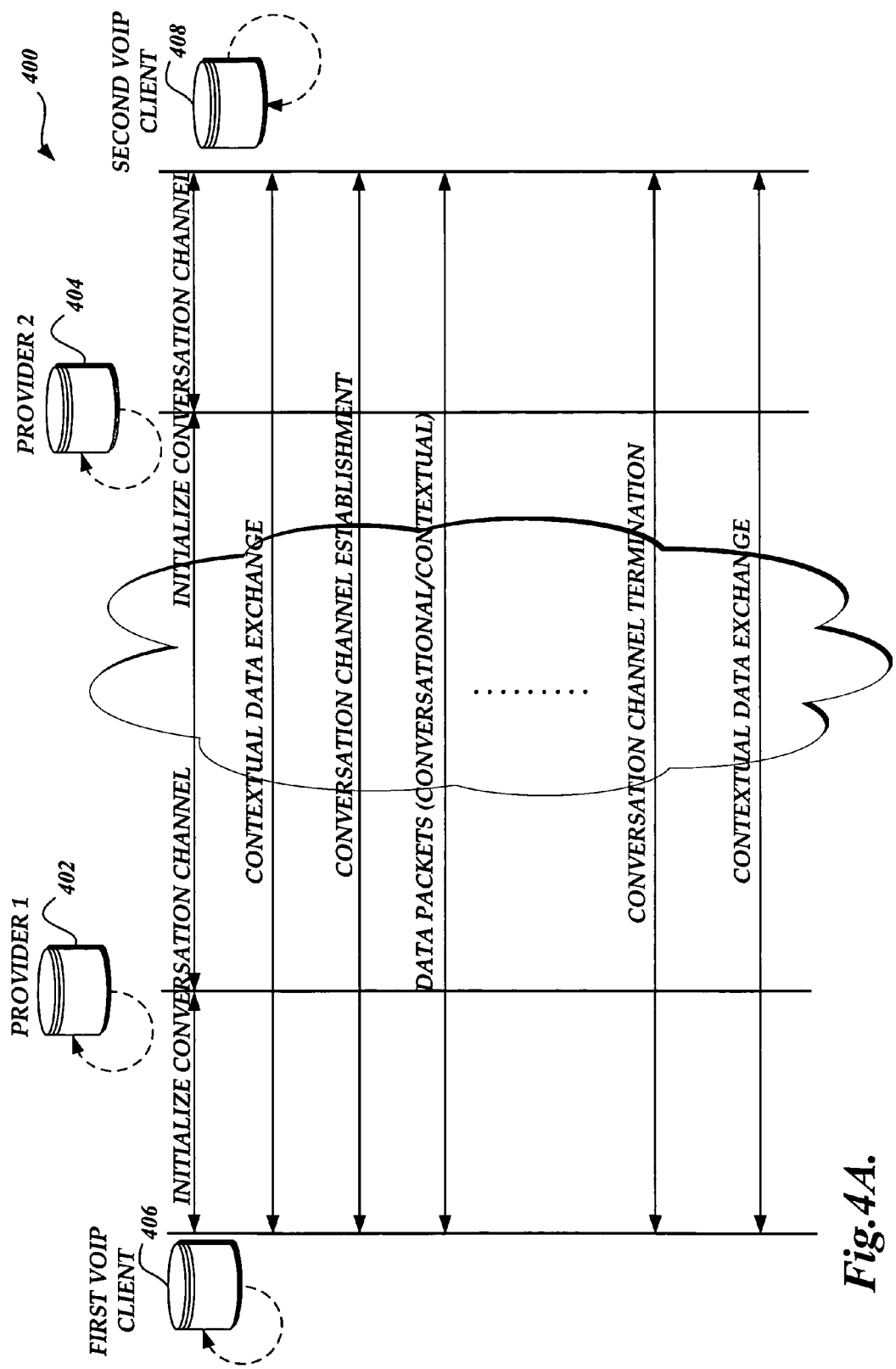
FIGS. 4A and 4B are block diagrams illustrative of the exchange of data between two VoIP clients over a conversation channel in accordance with an aspect of the present invention.

With reference to FIG. 4A, a block diagram illustrative of a conversation flow 400 between VoIP devices of two different VoIP clients over a conversation channel, in accordance with an embodiment of the present invention, is shown. During a connection set-up phase, a VoIP device of a first VoIP client 406 requests to initiate a conversation channel with a second VoIP client 408. In an illustrative embodiment, a VoIP service provider 402 (Provider 1) for the first VoIP client 406 receives the request to initiate a conversation channel and forwards the request to a VoIP service provider 404 (Provider 2) for the second VoIP client 406. While this example utilizes two VoIP service providers and two VoIP clients, any number and combination of VoIP clients and/or service providers may be used with embodiments of the present invention. For example, only one service provider may be utilized in establishing the connection. In yet another example, communication between VoIP devices may be direct, utilizing public and private lines, thereby eliminating the need for a VoIP service provider. In a peer to peer context, communication between VoIP devices may also be direct without having any service providers involved.

There are a variety of protocols that may be selected for use in exchanging information between VoIP clients, VoIP devices, and/or VoIP service providers. For example, when Session Initiation Protocol (SIP) is selected for a signaling protocol, session control information and messages will be exchanged over a SIP signaling path/channel and media streams will be exchanged over Real-Time Transport Protocol (RTP) path/channel. For the purpose of discussion, a communication channel, as used herein, generally refers to any type of data or signal exchange path/channel. Thus, it will be appreciated that depending on the protocol, a connection set-up phase and a connection termination phase may require additional steps in the conversation flow 400.

For ease of explanation, we will utilize the example in which both the first VoIP client 406 and the second VoIP client 408 each only includes one VoIP device. Accordingly, the discussion provided herein will refer to connection of the two VoIP devices. The individual using the device of the first VoIP client 406 may select or enter the unique VoIP identifier of the client that is to be called. Provider 1 402 receives the request from the device of the first VoIP client 408 and determines a terminating service provider (e.g., Provider 2 404 of the second VoIP client 408) based on the unique VoIP identifier included in the request. The request is then forwarded to Provider 2 404. This call initiation will be forwarded to the device of the second VoIP client. A conversation channel between the device of the first VoIP client 406 and a device of the second VoIP client 408 can then be established.

In an illustrative embodiment, before the devices of the first VoIP client 406 and the second VoIP client 408 begin to exchange data packets, contextual information may be exchanged. As will be discussed in a greater detail below, the contextual information may be packetized in accordance with a predefined structure that is associated with the conversation. Any device associated with the first VoIP client 406, the service provider of the first VoIP client 406, or a different device/service provider may determine the structure based on the content of the contextual information. In one embodiment, the exchanged contextual information may include information relating to the calling VoIP client 406, the device, and the VoIP client 408 being called. For example, the contextual information sent from the called VoIP client 406 may include priority list of incoming calls from various potential calling VoIP clients including VoIP client 406.

Available media types, rules of the calling client and the client being called, and the like, may also be part of the contextual information that is exchanged during the connection set-up phase. The contextual information may be processed and collected by one the devices of the first VoIP client 406, one of the devices of the second VoIP client 408, and/or by VoIP service providers (e.g., Provider 1 402 and Provider 2 404), depending on the nature of the contextual information.

In one embodiment, the VoIP service providers 402, 404 may add/or delete some information to/from the client's contextual information before forwarding the contextual information.

In response to a request to initiate a conversation channel, the second VoIP client 408 may accept the request for establishing a conversation channel or execute other appropriate actions such as rejecting the request via Provider 2 404. The appropriate actions may be determined based on the obtained contextual information. When a conversation channel is established, a device of the first VoIP client 406 and a device of the second VoIP client 408 start communicating with each other by exchanging data packets. As will be described in greater detail, the data packets, including conversation data packets and contextual data packets, are communicated over the established conversation channel between the connected devices.

Conversation data packets carry data related to a conversation, for example, a voice data packet, or multimedia data packet. Contextual data packets carry information relating to data other than the conversation data. Once the conversation channel is established, either the first VoIP client 406 or the second VoIP client 408 can request to terminate the conversation channel. Some contextual information may be exchanged between the first VoIP client 406 and the second VoIP client 408 after the termination.

Figure 4B:
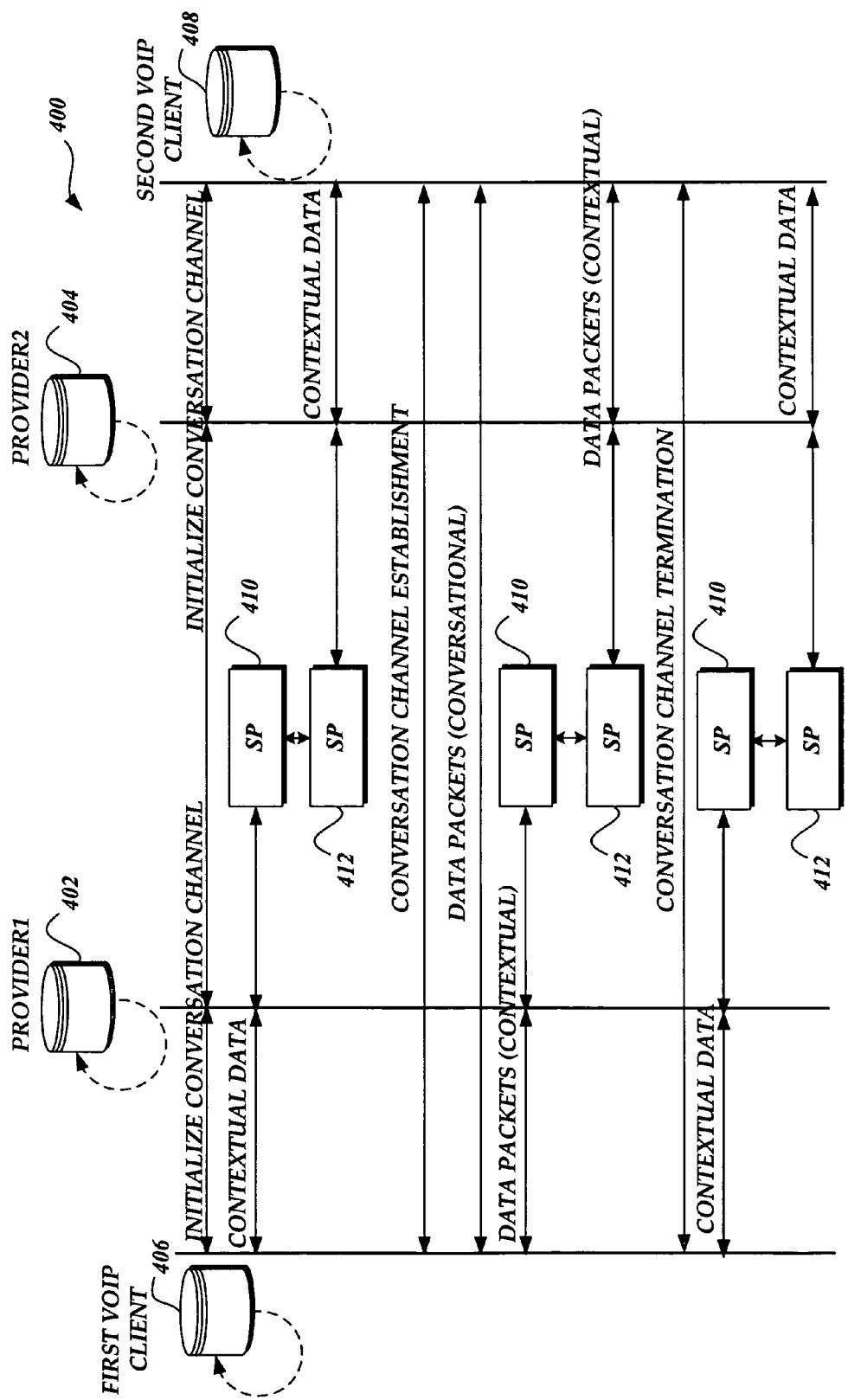

FIG. 4B is a block diagram illustrative of a conversation flow 400 between devices of two VoIP clients via several service providers, in accordance with an embodiment of the present invention. As with FIG. 4A, the example described herein will utilize the scenario in which each client only has one device associated therewith and the connection occurs between those two devices. During a connection set-up phase, a device of a first VoIP client 406 requests to initiate a conversation channel for communication with a second VoIP client 408. In an illustrative embodiment, a VoIP service provider 402 (Provider1) for the first VoIP client 406 receives the request to initiate a conversation channel and forwards the request to a VoIP service provider 404 (Provider2) for the second VoIP client 408.

Before the device of the first VoIP client 406 and the device of the second VoIP client 408 begin to exchange voice data packets, contextual information may be exchanged between the first VoIP client 406 and the second VoIP client 408. Contextual information may be exchanged using a structured organization defined by the first VoIP client 406. In one embodiment, Provider 1 402 may identify particular contextual information which Provider 1 402 desires to obtain from the first VoIP client 406. The first VoIP client 406 may specify the corresponding structure based on the content of the contextual information. The identification of the structure for exchanging information and additional contextual information may be transmitted to the second VoIP client 408 via Provider 2 404 and Provider 1 402.

The contextual information may be processed and collected at a device of the first VoIP client, a device of the second VoIP client, and/or the VoIP service providers (e.g., Provider1 and Provider2), depending on the nature of the contextual information. For example, voice profiles may be collected by the service providers 402, 404, and only temporarily provided to the devices. Further, third party Service Provider(s) (third party SP) 410, 412 can obtain and/or add contextual information exchanged among devices of the first VoIP client 406 and second VoIP client 408, Provider 1 402, and Provider 2 404. In one embodiment, any of Provider 1 402, Provider 2 404, and third party SP 410, 412 may add, modify and/or delete contextual information before forwarding the contextual information to the next VoIP device(s), including other service providers.

In response to a request to initiate a conversation channel, the second VoIP client 408 may accept the request for establishing a conversation channel or reject the request via Provider 2 404. When a conversation channel has been established, the devices of the first VoIP client 406 and the second VoIP client 408 start communicating with each other by exchanging data packets as discussed above. In one embodiment, contextual and/or conversation data packets may be forwarded to third party SPs 410, 412 from Provider 1 402, Provider 2 404, or from either VoIP client 406, 408. Further, the forwarded contextual and/or conversation data packets may be exchanged among various third party SPs 410, 412.

Figure 5:
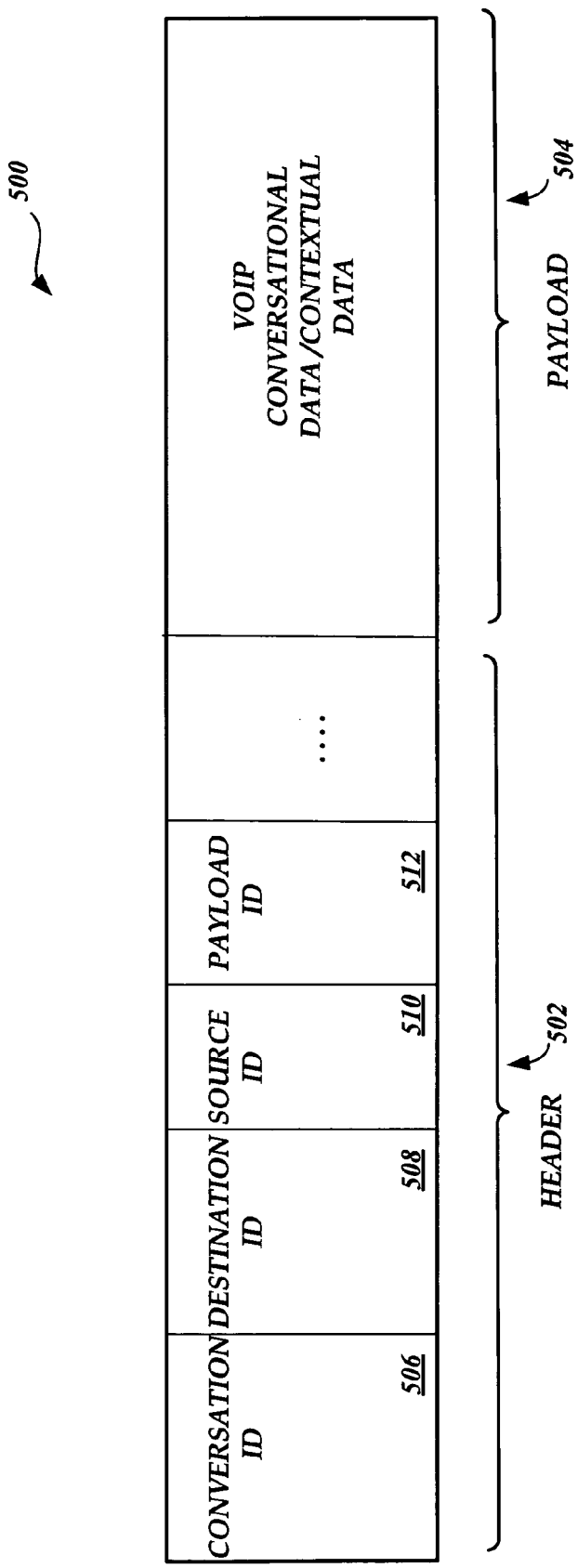
FIG. 5 is a block diagram of a data packet used over a communication channel established in the VoIP environment of FIG. 1.

FIG. 5 is a block diagram of a data packet structure 500 used over a communication (conversation) channel in accordance with an embodiment of the present invention. The data packet structure 500 may be a data packet structure for an IP data packet suitable for being utilized to carry conversation data (e.g., voice, multimedia data, and the like) or contextual data (e.g., information relating to the VoIP services, and the like). However, any other suitable data structure can be utilized to carry conversation data or contextual data. The data packet structure 500 includes a header 502 and a payload 504. The header 502 may contain information necessary to deliver the corresponding data packet to a destination. Additionally, the header 502 may include information utilized in the process of a conversation. Such information may include conversation ID 506 for identifying a conversation (e.g., call), a Destination ID 508, such as a unique VoIP identifier of the client being called, a Source ID 510 (unique VoIP identifier of the calling client or device identifier), Payload ID 512 for identifying type of payload (e.g., conversation or contextual), individual ID (not shown) for identifying the individual for which the conversation data is related, and the like. In an alternative embodiment, the header 502 may contain information regarding Internet protocol versions, and payload length, among others. The payload 504 may include conversational or contextual data relating to an identified conversation. As will be appreciated by one of ordinary skill in the art, additional headers may be used for upper layer headers such as a TCP header, a UDP header, and the like.

In one embodiment of the present invention, a structured hierarchy may be predefined for communicating contextual information over a VoIP conversation channel. The contextual information may include any information relating to VoIP clients, VoIP devices, conversation channel connections (e.g., call basics), conversation context (e.g., call context) and the like. More specifically, the contextual information may include client preference, client rules, client's location (e.g., user location, device location, etc.), biometrics information, the client's confidential information, VoIP device's functionality, VoIP service providers information, media type, media parameters, calling number priority, keywords, information relating to application files, and the like. The contextual information may be processed and collected at each VoIP client and/or the VoIP service providers depending on the nature of the contextual data. In one aspect, the VoIP service providers may add, modify and/or delete VoIP client's contextual data before forwarding the contextual information. For example, client's confidential information will be deleted by the VoIP service provider associated with that client unless the client authorizes such information to be transmitted. In some cases, a minimal amount of contextual information is transmitted outside of an intranet network.

Figure 6:
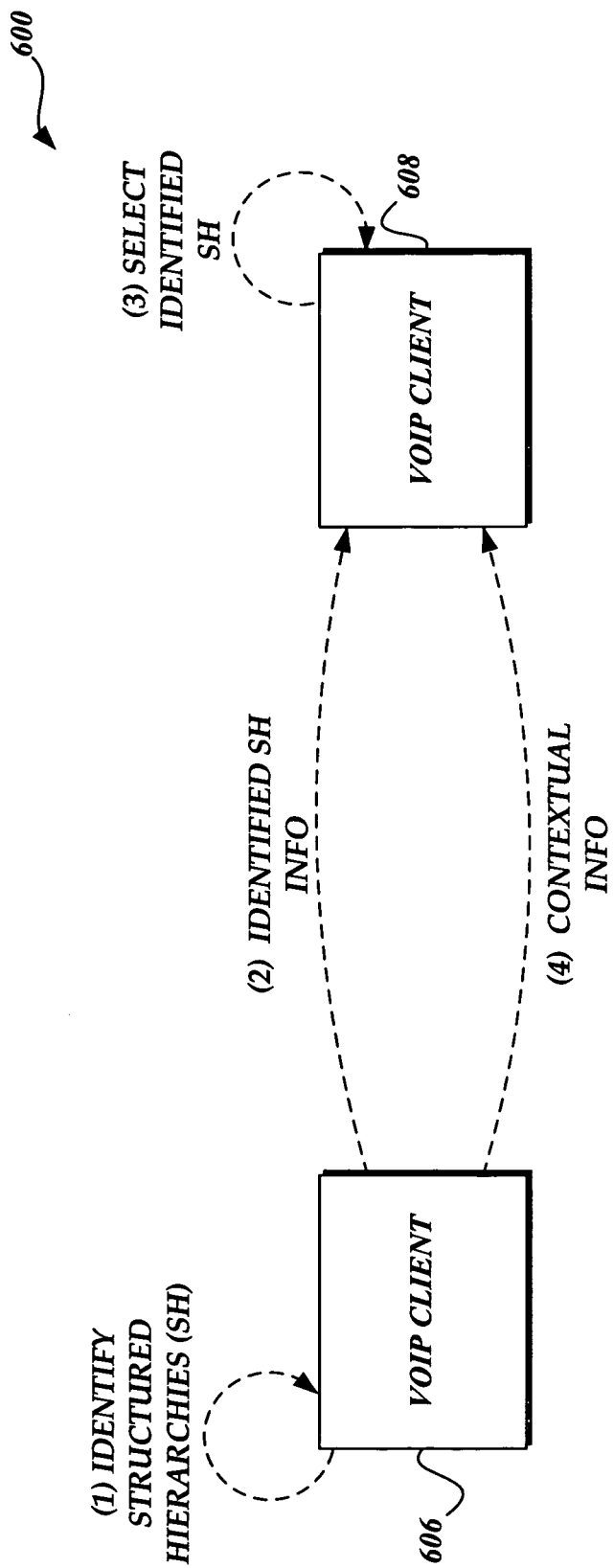
FIG. 6 is a block diagram illustrating interactions between two VoIP clients for transferring contextual information defined by identified structured hierarchies in accordance with an aspect of the present invention.

With reference to FIG. 6, a block diagram 600 illustrating interactions between two VoIP clients for transferring contextual information, in accordance with an embodiment of the present invention, is shown. As with FIGS. 4A and 4B, the example described herein will utilize the scenario in which each client only has one device associated therewith and the connection occurs between those two devices. In one embodiment, devices of VoIP Client 606 and VoIP Client 608 have established a VoIP conversation channel. It may be identified which structured hierarchies will be used to carry certain contextual information by VoIP Client 606. The information regarding the identified structured hierarchies may include information about which structured hierarchies are used to carry the contextual information, how to identify the structured hierarchy, and the like. Such information will be exchanged between VoIP Client 606 and VoIP Client 608 before the corresponding contextual information is exchanged. Upon receipt of the information about which structured hierarchy is used to carry the contextual information, VoIP Client 608 looks up predefined structured hierarchies (e.g., XML namespace and the like) to select the identified structured hierarchies. In one embodiment, the predefined structured hierarchies can be globally stored and managed in a centralized location accessible from a group of VoIP clients. In this embodiment, a Uniform Resource Identifier (URI) address of the centralized location may be transmitted from VoIP Client 606 to VoIP Client 608.

In another embodiment, each VoIP client may have a set of predefined structured hierarchies stored in a local storage of any devices or a dedicated local storage which all devices can share. The predefined structured hierarchies may be declared and agreed upon between VoIP clients before contextual information is exchanged. In this manner, the need to provide the structure of the contextual data packets may be eliminated and thus the amount of transmitted data packets corresponding to the contextual data is reduced. Further, by employing the predefined structured hierarchies, data packets can be transmitted in a manner which is independent of hardware and/or software.

Upon retrieving the identified structured hierarchy, VoIP Client 608 is expecting to receive a data stream such that data packets corresponding to the data stream are defined according to the identified structured hierarchies. VoIP Client 606 can begin sending contextual information represented in accordance with the identified structured hierarchies. In one embodiment, VoIP Client 608 starts a data binding process with respect to the contextual information. For example, instances of the identified structured hierarchies may be constructed with the received contextual information.

Figure 7A:
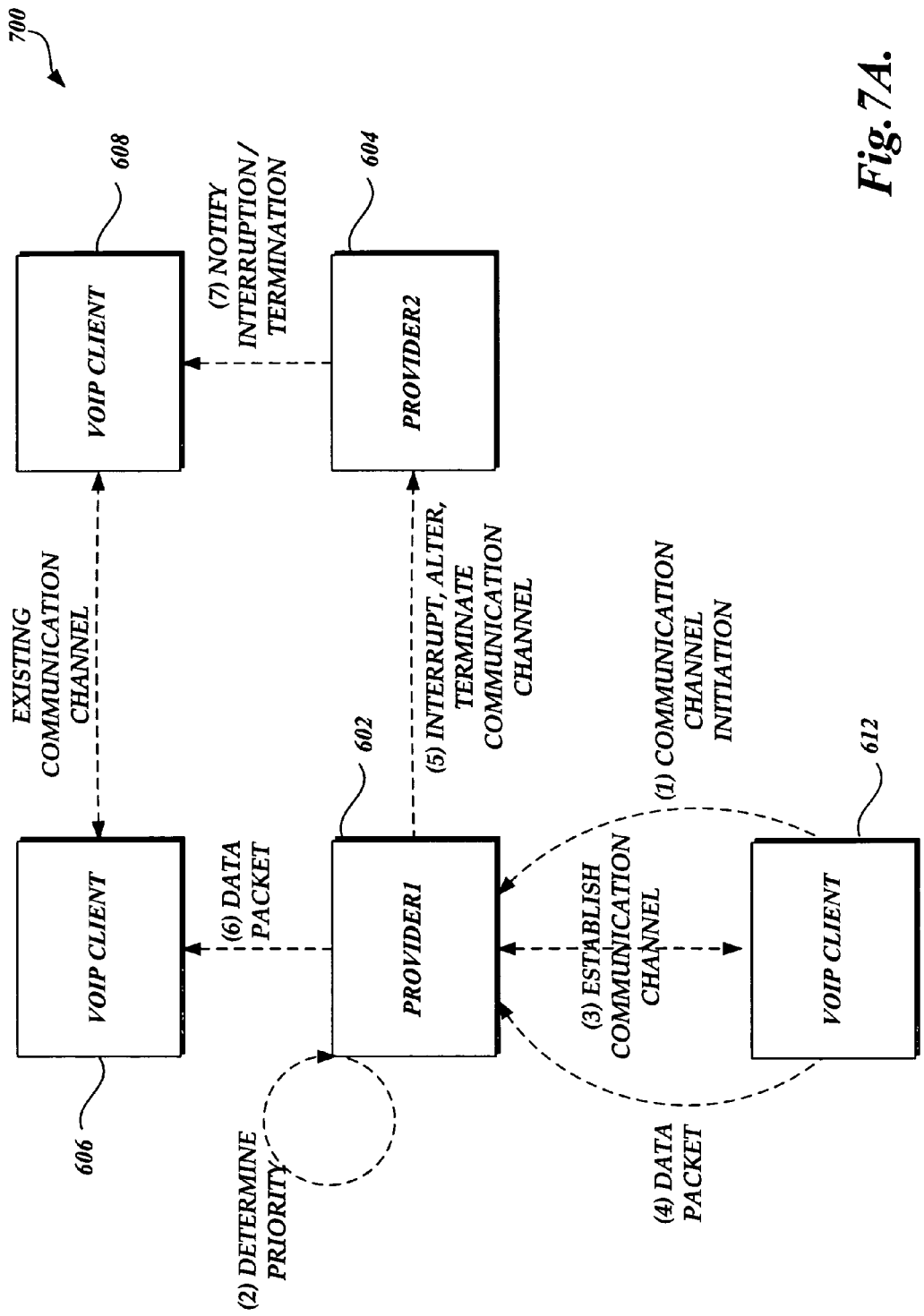
Figure 7C:
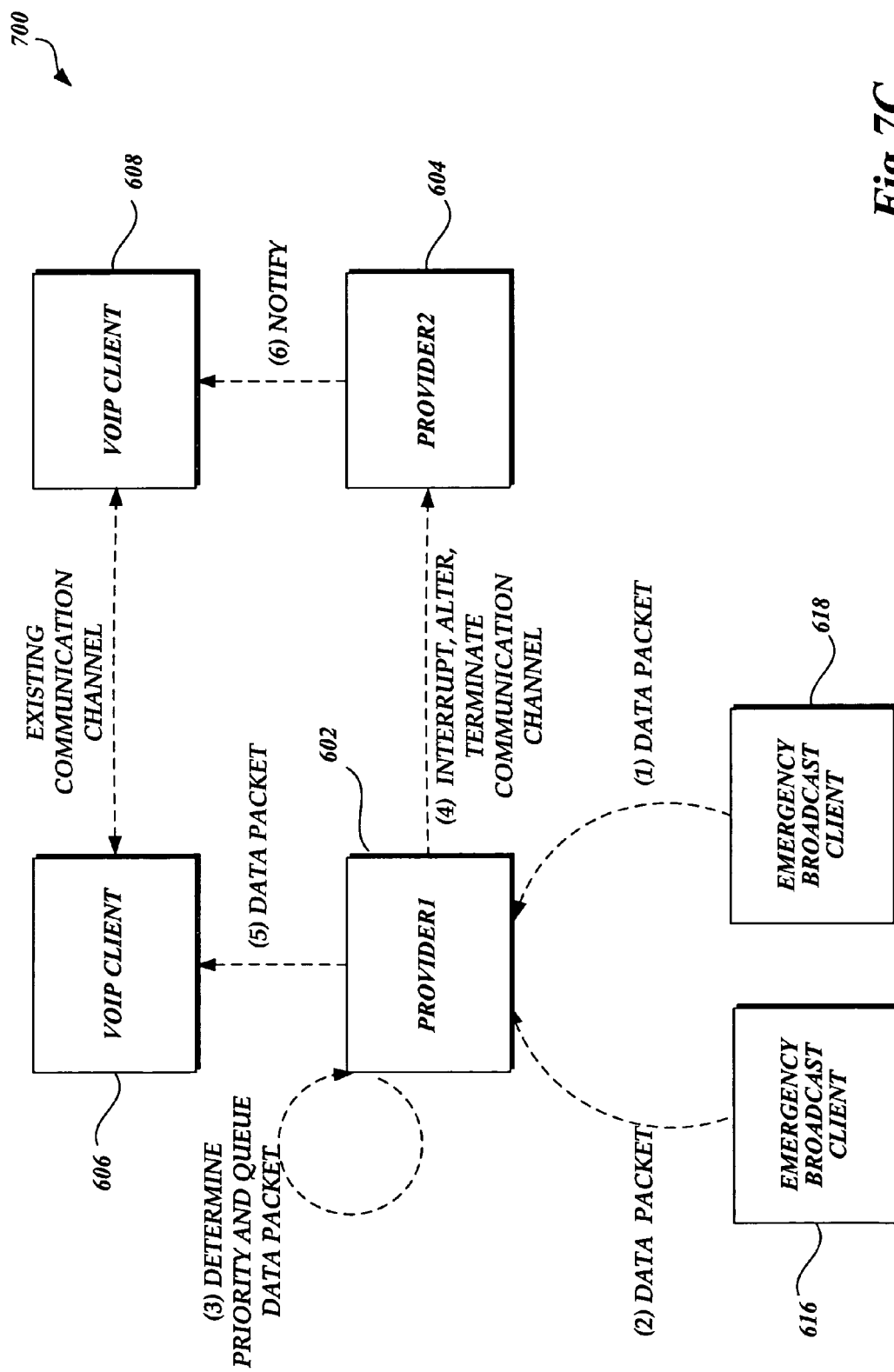
Figure 8:
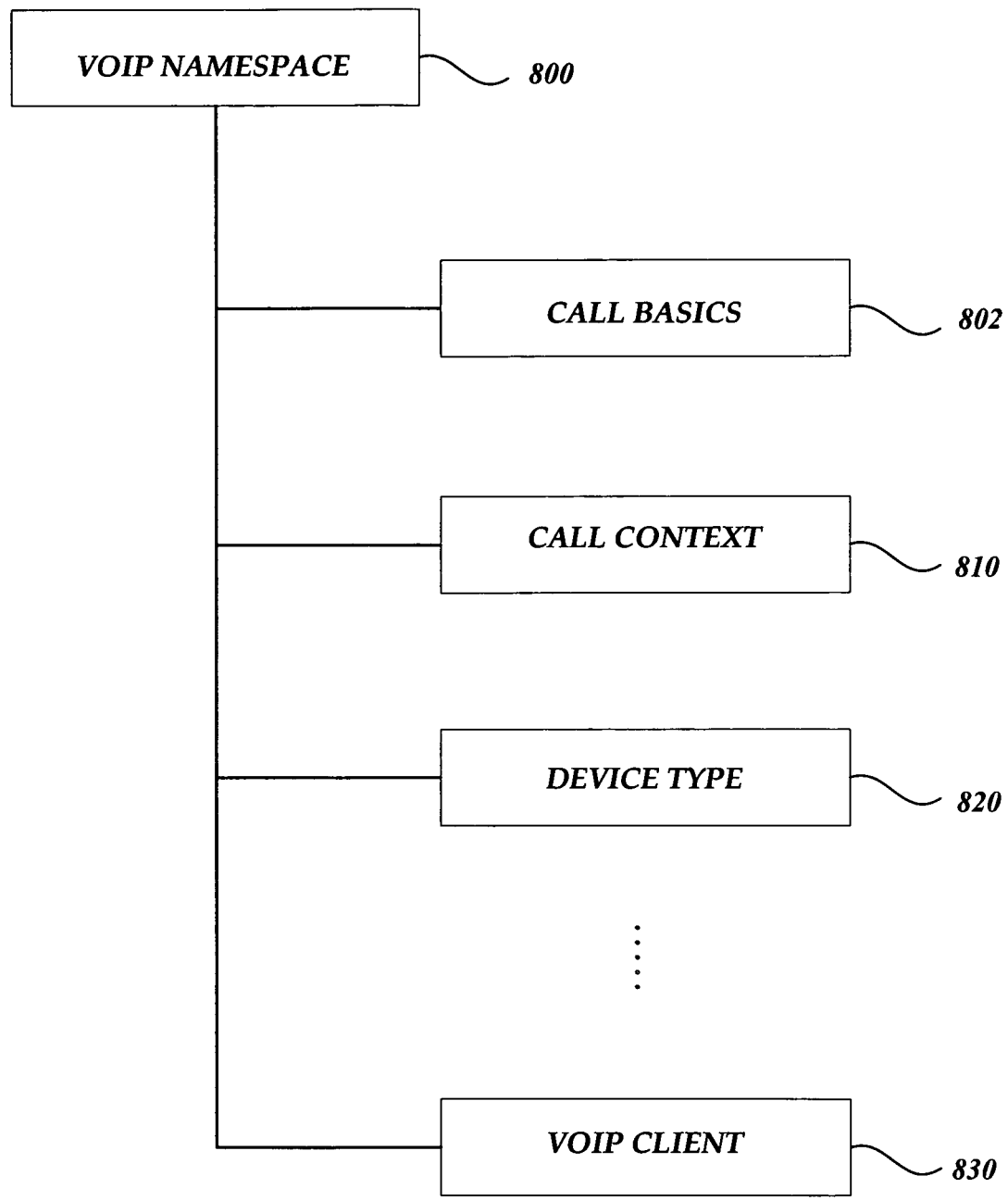
FIGS. 8-12 are block diagrams illustrative of various attribute and classes of structured hierarchies corresponding to VoIP contextual information in accordance with an aspect of the present invention.

FIGS. 7A-7C are block diagrams 700 illustrating interactions among VoIP entities in the VoIP environment utilizing data packet prioritization in accordance with an aspect of the present invention. In one embodiment, the VoIP entities may include VoIP clients, VoIP service providers for the clients, third party service providers and the like. It is to be noted that one of ordinary skill in the relevant art will appreciate that any suitable entities may be included in the VoIP telephone environment.

With reference to FIG. 7A, in one embodiment, VoIP Client 606 may already have an existing communication channel with VoIP Client 608. While this example utilizes two VoIP service providers and two VoIP clients, any number and combination of VoIP clients and/or service providers may be used with embodiments of the present invention. A service provider of VoIP Client 606, Provider 1 602 has already obtained contextual information including priority information from VoIP Client 606. As will be described in greater detail below, it is contemplated that structured hierarchies are utilized to carry contextual information (contextual data packets) between several VoIP entities in this illustrative embodiment. In the embodiment, Provider 1 602 may receive a request from VoIP Client 612 to initiate a communication channel between devices of VoIP Client 612 and VoIP Client 606. Provider 1 602 may determine priority levels of VoIP Client 608 and VoIP Client 612 based on the priority information obtained from VoIP Client 606. In one embodiment, contextual information corresponding to the priority information may include a predefined priority level for each potential VoIP client that may call VoIP Client 606. Alternatively, a predefined priority level can be specified based on a membership associated with a particular group of potential callers, or the VoIP client associated with the caller. In this example, if a potential caller is identified as a member of a particular group (e.g., a family, a customer, an emergency, a project team, etc.), a priority level of the particular group will be assigned to the potential caller.

If Provider 1 602 determines that VoIP Client 612 has higher priority than VoIP Client 608, Provider 1 602 accepts the request to initiate a communication channel between VoIP Client 612 and VoIP Client 606. The communication channel is established between VoIP Client 612 and VoIP Client 606. VoIP Client 612 starts sending data packets to Provider 1 602 over the established communication channel. In one embodiment, Provider 1 602 may terminate, interrupt, or alter the existing communication channel between VoIP Client 606 and VoIP Client 608. Upon termination of the existing communication channel, Provider 2 604 may notify VoIP Client 608 of the termination. In an alternative embodiment, Provider 1 602 may interrupt the existing communication channel by putting on hold data packets transmitted from VoIP Client 608. Upon interruption of the existing communication channel, Provider 2 604 may notify VoIP Client 608 of the interruption. As will be appreciated by one of ordinary skill in the art, VoIP Client 608 can terminate the communication channel any time during the interruption. After the communication channel between VoIP Client 606 and VoIP Client 608 has been terminated or interrupted, VoIP Client 606 and VoIP Client 612 can exchange data packets between each other over the newly established communication channel. Provider 1 602 may transmit the data packets received from VoIP Client 612 to the VoIP Client 606. It is contemplated that an authorized VoIP client or device can force a change in priority levels of data packets even after the priority levels have been determined. Such a change may occur at any time (e.g., before, during, and/or after a conversation). It is also contemplated that the priority levels of data packets can be dynamically evaluated and altered based on contextual information received from VoIP clients, service providers, or other VoIP entities.

In one embodiment, priority levels of data packets may be determined based on numerous kinds of information including priority of sending client, size and type (e.g., multimedia, text, audio, application file, and the like) of data packets, callee preferences and the like. In an illustrative embodiment, Provider 1 602 may determine the priority level of data packets based on the type of data packets when it is not able to compare the priority levels of VoIP Client 612 and VoIP Client 608. For example, VoIP Client 612 and VoIP Client 608 have the same level of priority. Provider 1 602 may assign priorities such that data packets requiring real-time data transfer have a higher priority than others. Similarly, Provider 1 602 may consider the size of the contextual information. Data packets relating to contextual information which have a small amount of information may have higher priority than others.

With reference to FIG. 7B, in another illustrative embodiment, a device of VoIP Client 606 may already have an existing communication channel with VoIP Client 608. Provider 1 602 may receive a request from VoIP Client 612 to initiate a new communication channel with VoIP Client 606. At approximately the same time, Provider 1 602 may receive an emergency data packet from Emergency Broadcast (EB) Client 614. (e.g., emergency broadcasting message to VoIP clients in certain geographic areas). It is contemplated that EB Client 614 may include any client with an authority to broadcast emergency data packets via its associated one or more providers. In this embodiment, Provider 1 602 may provide VoIP services to both VoIP Client 612 and EB Client 614. In order to decide which data packet is to be transmitted to VoIP Client 606, Provider 1 602 determines priority levels of VoIP Client 608, VoIP Client 612 and EB Client 614 based on the priority information obtained from VoIP Client 606. In one embodiment, the priority information may include a predefined priority level for each potential caller for the VoIP Client 606, a predefined priority level for a group of potential callers, or the like.

In an illustrative embodiment, VoIP Client 606 may have specified a higher priority level to EB Client 614 than VoIP Client 612 or VoIP Client 608. In this embodiment, Provider 1 602 may terminate, interrupt, or alter the existing communication channel in order to transmit EB data packets. Upon termination of the existing communication channel, Provider 2 604 may notify VoIP Client 608 of the termination. However, based on the client preference information of VoIP Client 606, Provider 1 602 may interrupt the existing communication channel by putting on hold data packets from VoIP Client 608. Upon interruption of the existing communication channel, Provider 2 604 may notify VoIP Client 608 of the interruption. VoIP Client 608 can terminate the existing communication channel any time during the interruption. Provider 1 602 rejects the request from VoIP Client 612 to initiate a communication channel.

After terminating, interrupting, or altering the communication channel between VoIP Client 606 and VoIP Client 608, Provider 1 602 may transmit the emergency data packets received from EB Client 614 to the VoIP Client 608. Generally, a typical two-way communication channel may not be necessary for emergency broadcasting and thus VoIP Client 606 can receive incoming data packets from EB Client 614 but not be able to send outgoing data packets to EB Client 614.

With reference to FIG. 7C, in one embodiment, a device of VoIP Client 606 may already have an existing communication channel with VoIP Client 608. Provider 1 602 may receive emergency data packets from one or more EB clients 616, 618. In this embodiment, Provider 1 602 may receive a first set of emergency data packets from EB Client 616 and a second set of emergency data packets from EB Client 618. Provider 1 602 may determine priority levels of EB Client 616 and EB Client 618 based on the priority information obtained from VoIP Client 606, or based on a predefined priority information for EB clients. In one embodiment, contextual information corresponding to the priority information may be exchanged to provide information relating to a predefined priority level for each potential caller for VoIP Client 606, a predefined priority level for a group of potential callers, or the like.

In one embodiment, VoIP Client 606 may have specified a predefined priority level for a group of potential callers. For example, VoIP Client 606 may have assigned the highest priority level to a group of EBs, the second highest priority level to Family members, the third highest level to Friends and so on. Although EBs have the highest priority, individual EBs (e.g., EB Client 616 and EB Client 618) can not be compared since they may have the same level of priority. In this embodiment, Proivder1 may maintain a provider priority list for emergency clients and determine the priority level for EB Client 616 and EB Client 618 based on the provider priority list in conjunction with the priority information provided from VoIP Client 606.

For the purpose of discussion, assume that Provider 1 602 may determine that EB Client 616 has a higher priority than EB Client 618. As explained above, Provider 1 602 may terminate, interrupt, or alter the existing communication channel between VoIP Client 606 and VoIP Client 608. Upon termination of the existing communication channel, Provider 2 604 may notify VoIP Client 608 of the termination. Likewise, upon interruption of the existing communication channel, Provider 2 604 may notify VoIP Client 608 of the interruption. VoIP Client 608 can terminate the communication channel any time during the interruption. After terminating or interrupting the existing communication channel between VoIP Client 606 and VoIP Client 608, Provider 1 602 may transmit the emergency data packets transmitted from EB Client 616 to VoIP Client 606. As will be appreciated by one of ordinary skill in the art, a typical two-way communication channel may not be necessary for emergency broadcasting and thus VoIP Client 606 may receive incoming data packets from EB Client 614 but not be able to send outgoing data packets. In an alternative embodiment, Provider 1 602 may store data packets transmitted from EB Client 618 in a storage area such as a buffer and the like. The stored emergency data packets may be transmitted after data packets from EB Client 616 have been transmitted.

As mentioned above, structured hierarchies may be identified for communicating contextual information corresponding to called VoIP client's priority information. Further, the information regarding the identified structured hierarchies may be transmitted. The information regarding the identified structured hierarchies may include the information about which structured hierarchies carry the contextual information, how to identify the structured hierarchies, and the like. Subsequently, the contextual information corresponding to priority information may be represented in accordance with the identified structured hierarchies and transmitted.

In one embodiment, the structured hierarchies may be defined by Extensible Markup Language (XML). However, it is to be appreciated that the structured hierarchies can be defined by any language suitable for implementing and maintaining extensible structured hierarchies. Generally described, XML is well known for a cross-platform, software and hardware independent tool for transmitting information. Further, XML maintains its data as a hierarchically-structured tree of nodes, each node comprising a tag that may contain descriptive attributes. Typically, a XML namespace is provided to give the namespace a unique name. In some instances, the namespace may be used as a pointer to a centralized location containing default information about the namespace.

In an illustrative embodiment, VoIP Client 606 may identify a XML namespace for contextual information. For example, the XML namespace attribute may be placed in the start tag of a sending element. It is to be understood that XML namespaces, attributes, classes illustrated herein are provided merely as an example of structured hierarchies used in conjunction with various embodiments of the present invention. After VoIP Client 608 receives the XML namespace information, the VoIP Client 606 transmits a set of contextual data packets defined in accordance with the identified XML namespace to VoIP Client 608. When a namespace is defined in the start tag of an element, all child elements with the same prefix are associated with the same namespace. As such, VoIP Client 608 and VoIP Client 606 can transmit contextual information without including prefixes in all the child elements, thereby reducing the amount of data packets transmitted for the contextual information.

With reference to FIGS. 8-12, block diagrams illustrative of various classes and attributes of structured hierarchies corresponding to VoIP contextual information are shown. The VoIP contextual information exchanged between various VoIP entities (e.g., clients, service providers, etc.) may correspond to a VoIP namespace 800. In one embodiment, the VoIP namespace 800 is represented as a hierarchically structured tree of nodes, each node corresponding to a subclass which corresponds to a subset of VoIP contextual information. For example, a VoIP Namespace 800 may be defined as a hierarchically structured tree comprising a Call Basics Class 802, a Call Contexts Class 810, a Device Type Class 820, a VoIP Client Class 830 and the like.

Figure 9:
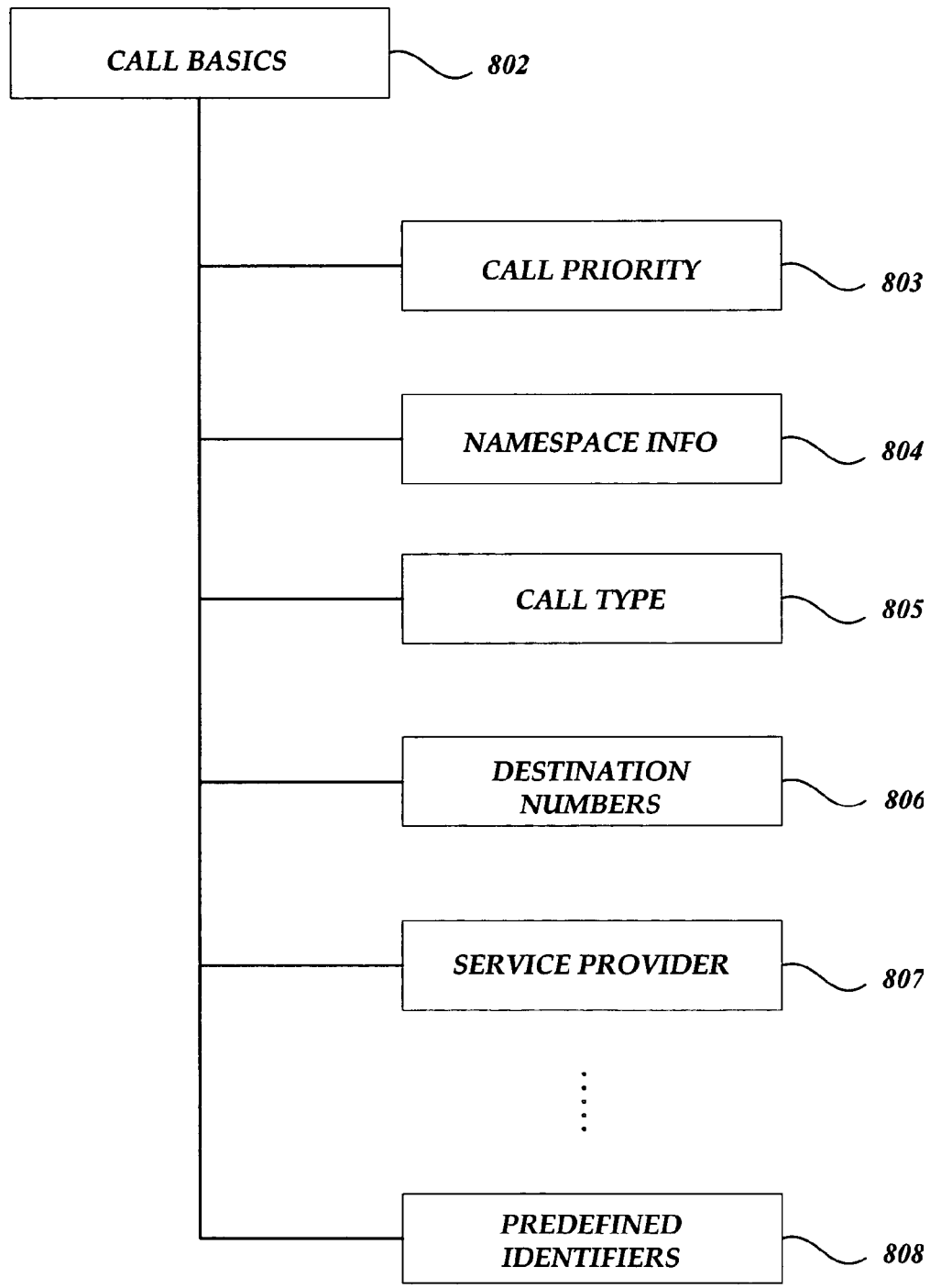

With reference to FIG. 9, a block diagram of a Call Basics Class 802 is shown. In an illustrative embodiment, Call Basics Class 802 may correspond to a subset of VoIP contextual information relating to a conversation channel connection (e.g., a PSTN call connection, a VoIP call connection, and the like). The subset of the VoIP contextual information relating to a conversation channel connection may include originating numbers (e.g., a caller's VoIP ID number), destination numbers (e.g., callees' VoIP ID numbers or telephone numbers), call connection time, VoIP service provider related information, and/or ISP related information such as IP address, MAC address, namespace information and the like. Additionally, the contextual information relating to a conversation channel connection may include call priority information (which defines the priority levels of the destination numbers), call type information, and the like. The call type information may indicate whether the conversation channel is established for an emergency communication, a broadcasting communication, a computer to computer communication, a computer to POTS device communication, and so forth. In one embodiment, the contextual information relating to a conversation channel connection may include predefined identifiers which represent emotions, sounds (e.g., "ah", "oops", "wow", etc.) and facial expressions in graphical symbols. In one embodiment, a Call Basics Class 802 may be defined as a sub-tree structure of a VoIP Namespace 800, which includes nodes such as call priority 803, namespace information 804, call type 805, destination numbers 806, service provider 807, predefined identifiers 808, and the like.

Figure 10:
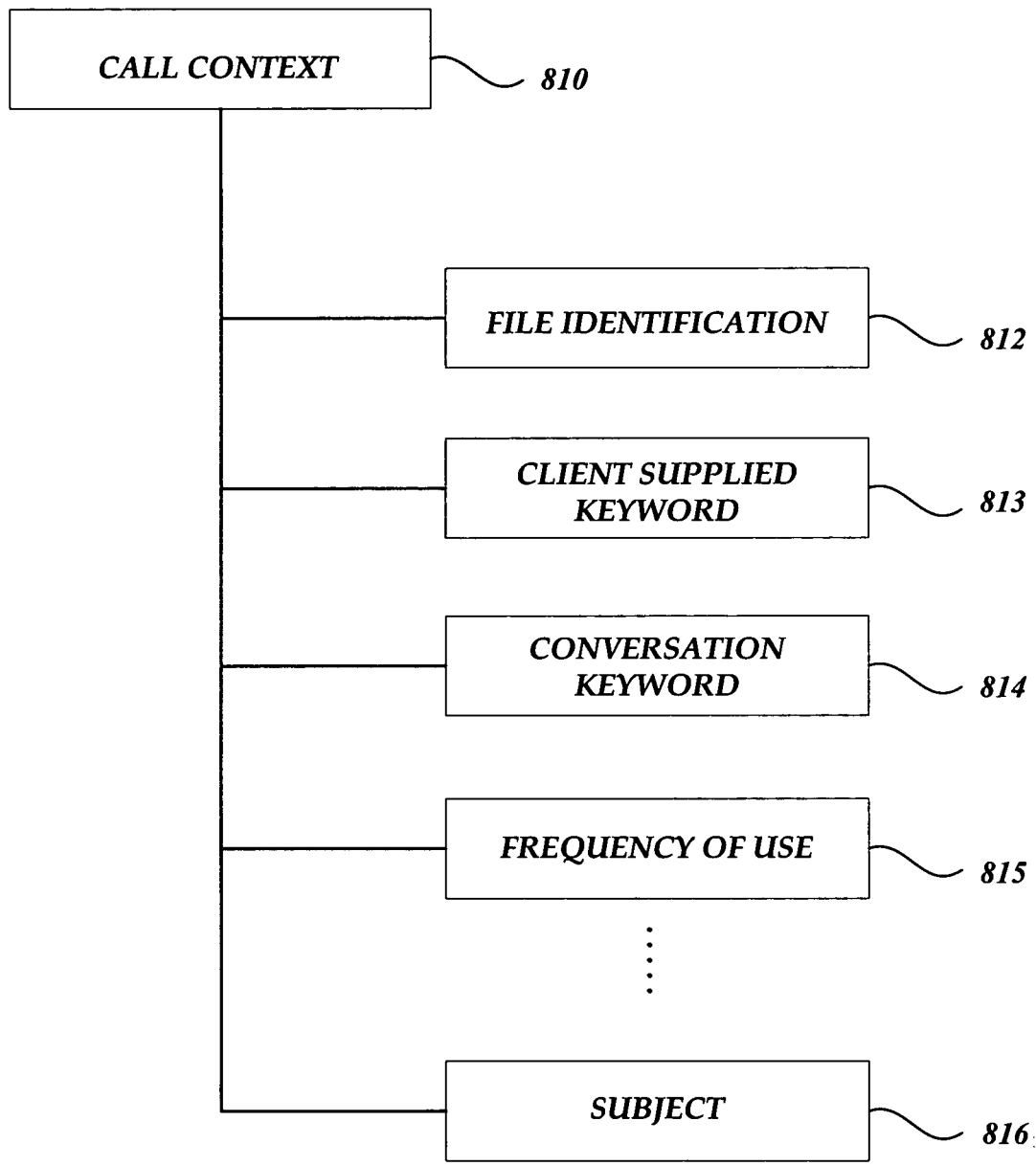

With reference to FIG. 10, a block diagram of a Call Contexts Class 810 is shown. In one embodiment, a subset of VoIP contextual information relating to conversation context may correspond to the Call Contexts Class 810. The contextual information relating to conversation context may include information such as client supplied keywords, identified keywords from document file data, identified keywords from a conversation data packet (e.g., conversation keywords), file names for documents and/or multimedia files exchanged as part of the conversation, game related information (such as a game type, virtual proximity in a certain game), frequency of use (including frequency and duration of calls relating to a certain file, a certain subject, and a certain client), and file identification (such as a case number, a matter number, and the like relating to a conversation), among many others. In accordance with an illustrative embodiment, a Call Contexts Class 810 may be defined as a sub-tree structure of a VoIP Namespace 800, which includes nodes corresponding to file identification 812, client supplied keyword 813, conversation keyword 814, frequency of use 815, subject of the conversation 816, and the like.

Figure 11:
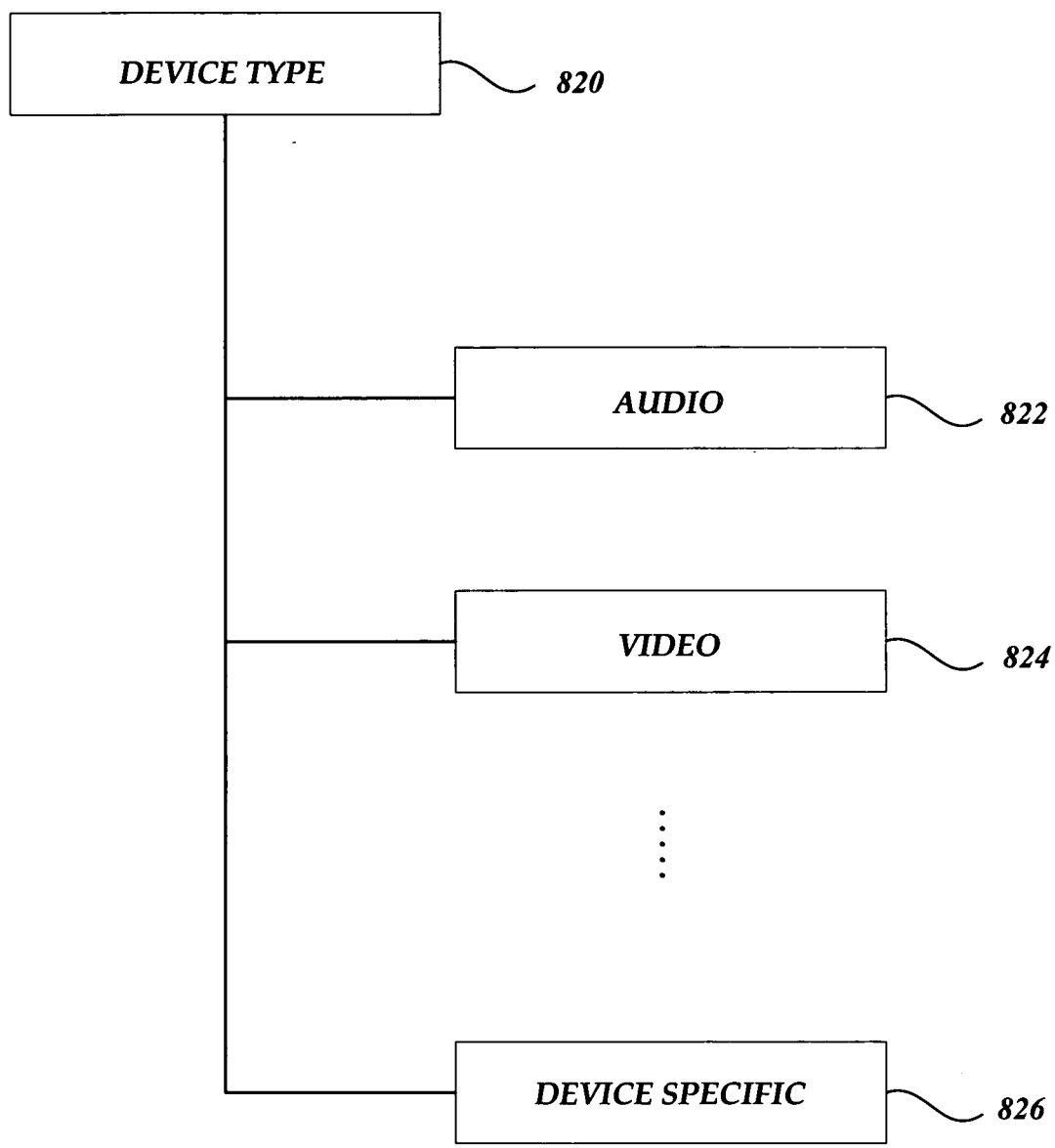

With reference to FIG. 11, a block diagram of a Device Type Class 820 is depicted. In one embodiment, a Device Type Class 820 may correspond to a subset of VoIP contextual information relating to a VoIP client device used for the conversation channel connection. The subset of the VoIP contextual information relating to the VoIP client device may include audio related information which may be needed to process audio data generated by the VoIP client device. The audio related information may include information related to the device's audio functionality and capability, such as sampling rate, machine type, output/input type, microphone, Digital Signal Processing (DSP) card information, and the like. The subset of the VoIP contextual information relating to the VoIP client device may include video related information which may be needed to process video data generated by the VoIP client device. The video related information may include resolution, refresh, type and size of the video data, graphic card information, and the like. The contextual information relating to VoIP client devices may further include other device specific information such as a type of the computer system, processor information, network bandwidth, wireless/wired connection, portability of the computer system, processing settings of the computer system, and the like. In an illustrative embodiment, a Device Type Class 820 may be defined as a sub-tree structure of a VoIP Namespace 800, which includes nodes corresponding to Audio 822, Video 824, Device Specific 826 and the like.

Figure 12:
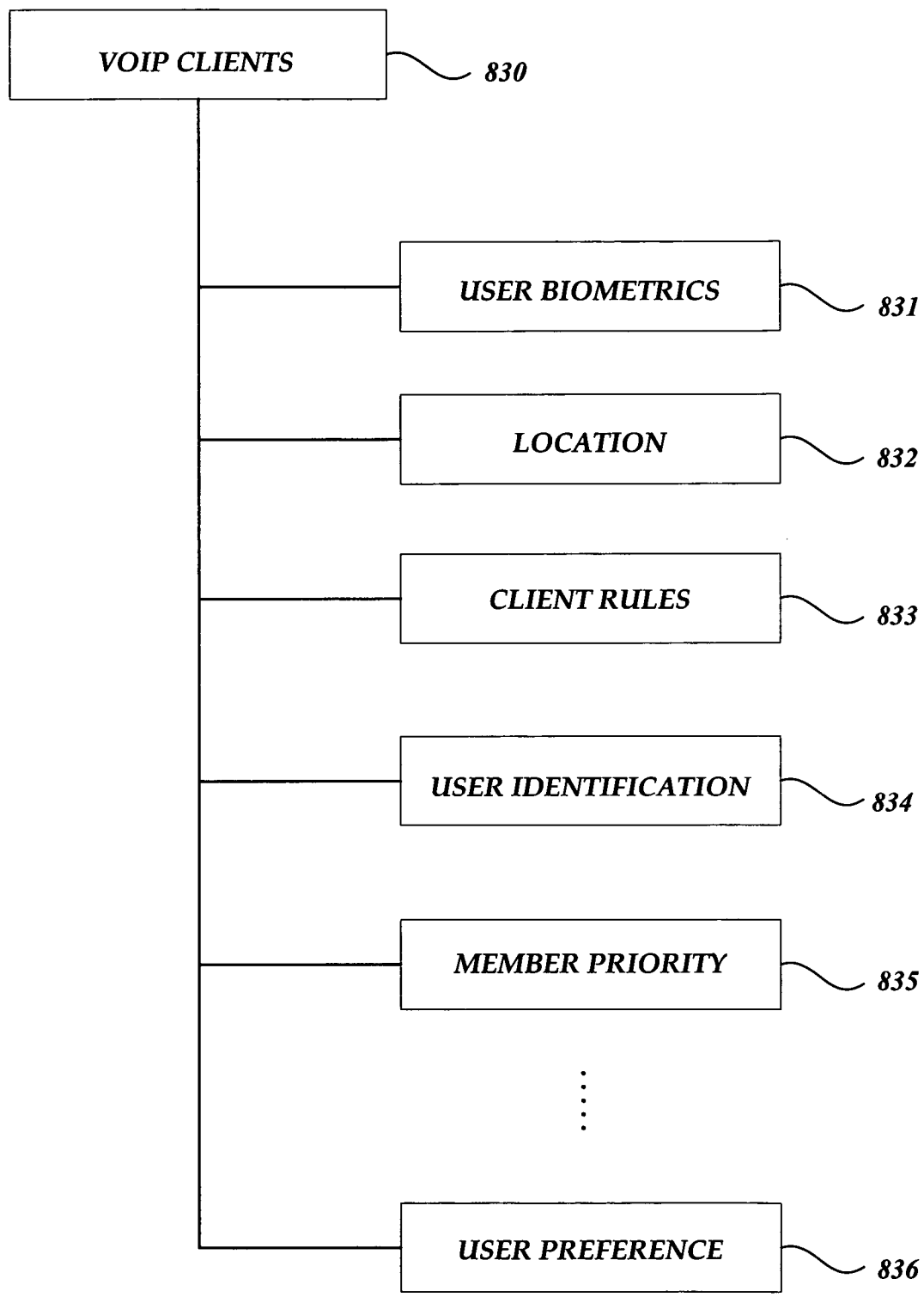

With reference to FIG. 12, a block diagram of a VoIP Client Class 830 is depicted. In accordance with an illustrative embodiment, a VoIP Client Class 830 may correspond to a subset of contextual information relating to VoIP clients. In one embodiment, the subset of the VoIP contextual information relating to the VoIP client may include voice profile information (e.g., a collection of information specifying the tonal and phonetic characteristics of an individual user), digital signature information, and biometric information. The biometric information can include user identification information (e.g., fingerprint) related to biometric authentication, user stress level, user mood, etc. Additionally, the subset of the VoIP contextual information relating to the VoIP client may include location information (including a client defined location, a VoIP defined location, a GPS/triangulation location, and a logical/virtual location of an individual user), assigned phone number, user contact information (such as name, address, company, and the like), rules defined by the client, user preferences, digital rights management (DRM), a member rank of an individual user in an organization, priority associated with the member rank, and the like. The priority associated with the member rank may be used to assign priority to the client for a conference call. In one embodiment, a VoIP Client Class 830 may be defined as a sub-tree structure of a VoIP Namespace 800, which includes nodes corresponding to user biometrics 831, location 832, client rules 833, user identification 834, member priority 835, user preference 836, and the like.

Figure 13:
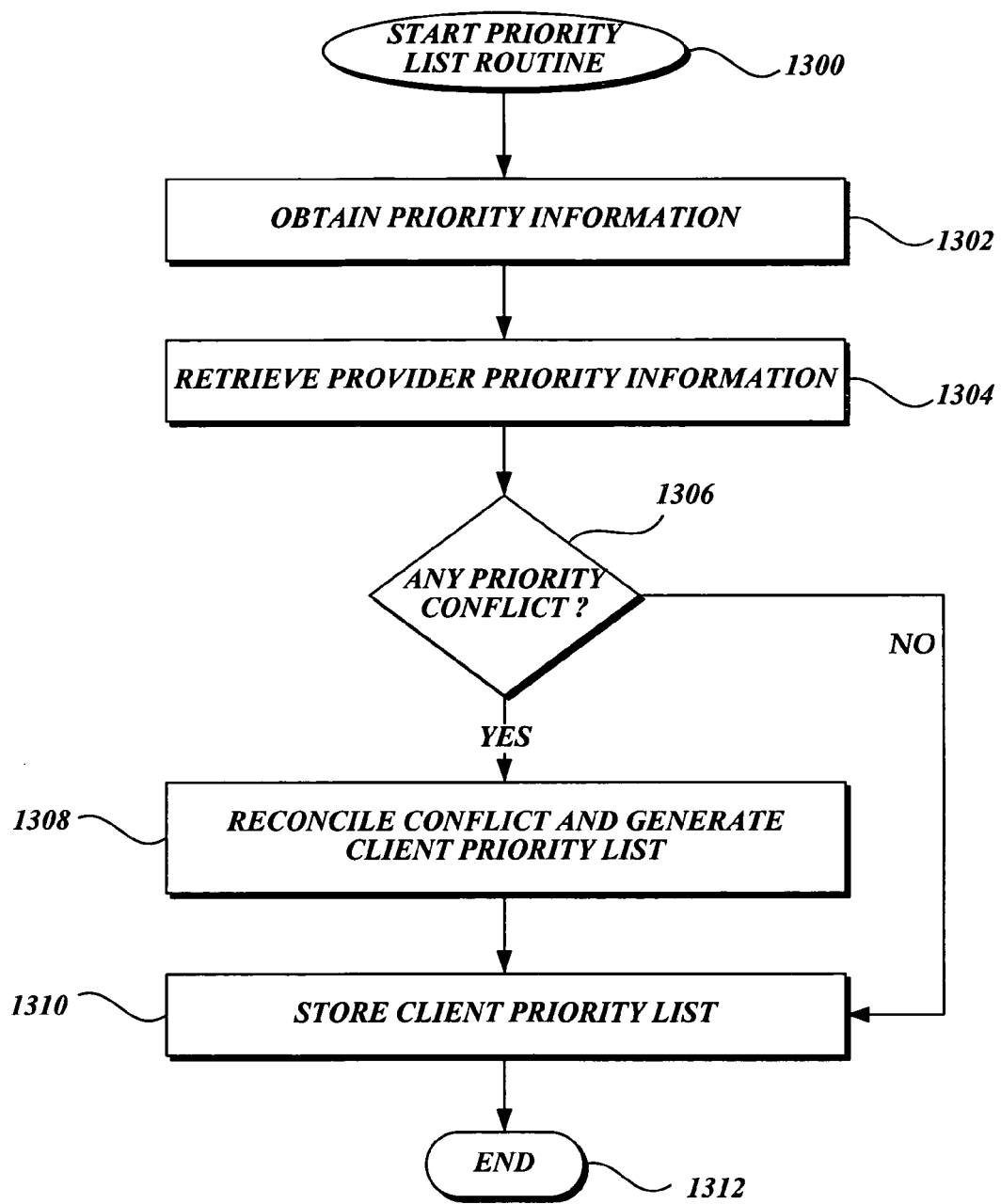
FIG. 13 is a flow diagram of a priority list routine for managing priority lists in accordance with an aspect of the present invention.

FIG. 13 illustrates a flow diagram of a priority list routine 1300 for managing priority lists in accordance with an embodiment of the present invention. Beginning with block 1302, a service provider obtains a client priority list for potential calling VoIP clients from a called VoIP client (callee). The priority for incoming calls can be defined by a callee, a service provider, or any other authorized third party. The service provider may retrieve its own priority list which includes priority information of calling VoIP clients at block 1304. For example, the service provider may maintain a priority list to assign different priority levels to different EB clients. For example, the service provider may have several EB clients such as a national security related emergency broadcaster, a fire department related emergency broadcaster, a Federal Emergency Management Agency (FEMA) related emergency broadcaster, a service related emergency broadcaster, and the like. In this example, each EB client may have a different level of priority based on a current emergency situation. Each EB client may have different levels or sub-levels of priority based on a current emergency situation, an individual user's member ranking, or the like. Further, the service provider may obtain priority information from various sources. In one embodiment, the service provider may obtain its corresponding priority information from a centralized repository such as a centralized database server which may be centrally managed by either public or private entities. In an alternative embodiment, the service provider may obtain priority information from another service provider.

The priority list routine 1300 proceeds to decision block 1306 to determine whether there is any priority conflict between the client priority list and the provider priority list. In accordance with the illustrative embodiment, the service provider may compare the client priority list and the provider priority list to determine any conflicts. If it is determined that there is a priority conflict, the service provider may reconcile the conflicts and make an updated client priority list at block 1308. In emergency cases, the provider priority list may have more weight than the client priority list. In this manner, urgent emergency broadcast messages can be transmitted without a further delay. Alternatively, the called VoIP client may be given a choice to select either the client priority list or the provider priority list. Further, the called VoIP client can specify a set of rules or preferences relating to how any priority conflict should be resolved. For example, the called VoIP client may specify a set of rules indicating that the called VoIP client will redefine priorities in case of a priority conflict.

If there is no priority conflict determined, the service provider may not make any changes in the client priority list. The priority list routine 1300 continues to block 1310 where the client property list is stored for use to determine the priority levels of calling VoIP clients. In an alternative embodiment, the priority level of a calling VoIP client may be determined based on an individual user of the calling VoIP client. It is contemplated that an authorized VoIP entity can override predetermined priority levels of data packets any time before, during, and/or after a conversation. It is also contemplated that the priority levels of data packets can be dynamically evaluated based on contextual information received from VoIP clients, service providers, and/or other VoIP entities. The priority list routine 1300 completes at block 1312.

Figure 14:
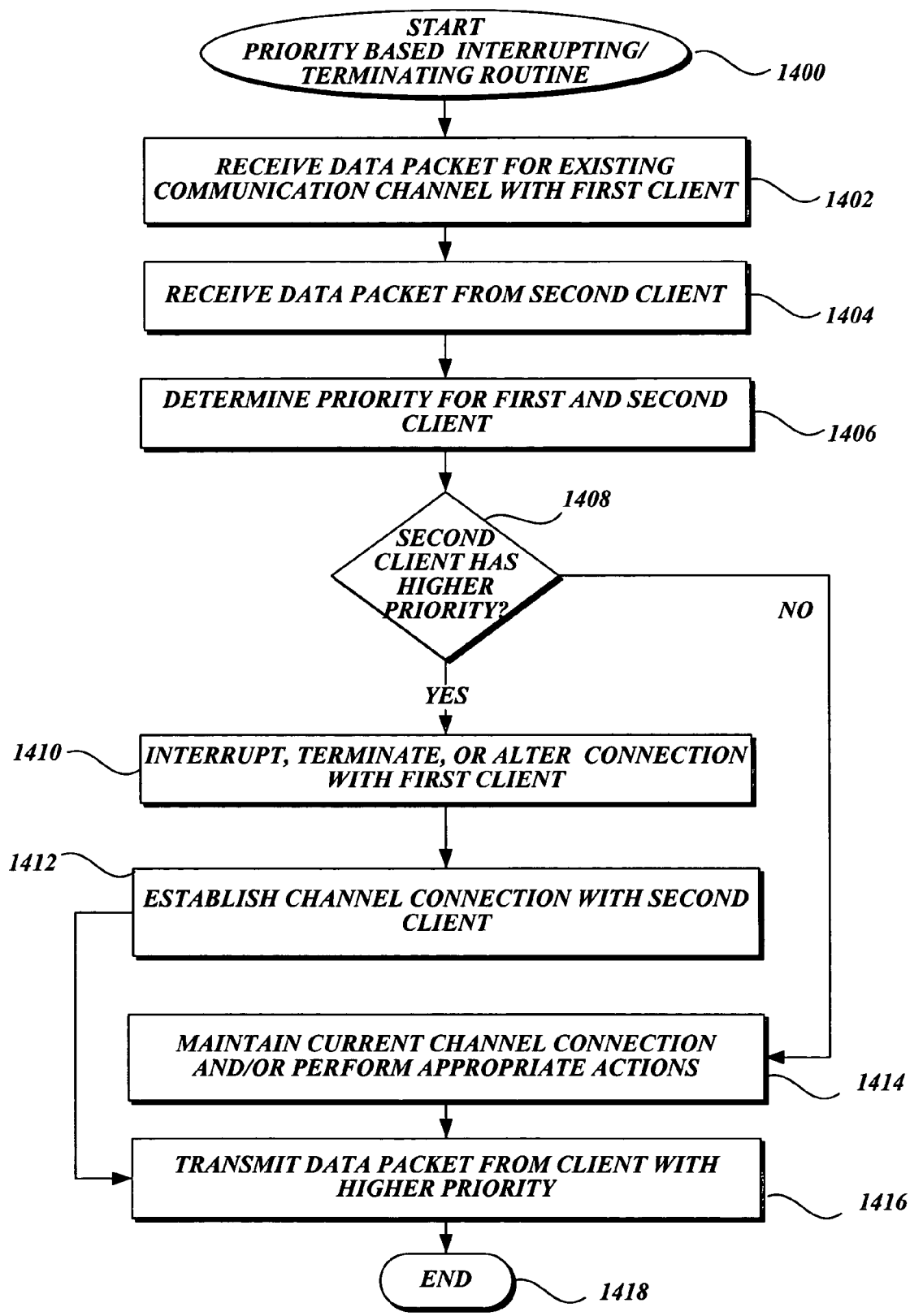
FIG. 14 is a flow diagram of a priority-based interrupting/terminating routine for interrupting/terminating the existing communication channel in accordance with an embodiment of the present invention.

With reference to FIG. 14, a flow diagram of a priority-based interrupting/terminating routine 1400 for managing priority lists in accordance with an embodiment of the present invention is shown. In an illustrative embodiment, a caller (calling VoIP client) and a callee (called VoIP client) may be exchanging a VoIP conversation over an existing communication channel. As described above, each service provider obtains contextual information of its clients at the conversation set-up phase. Although the illustrative embodiment is focused on the callee (called VoIP client) receiving calls from various clients, it is contemplated that both the caller and the callee can have incoming calls from various VoIP clients. In addition, the service provider of the callee may obtain and/or manage priority information for incoming calls destined to the callee. Likewise, the service provider of the caller may obtain and/or manage priority information for incoming calls destined to the caller. Further, each service provider may maintain a provider priority list to determine priority level for calling VoIP clients.

In accordance with the illustrative embodiment, the priority-based interrupting/terminating routine 1400 starts from block 1402 where the service provider receives a data packet for an existing communication channel with the first VoIP client (e.g., a calling VoIP client). At block 1404, the service provider receives a data packet from the second VoIP client (e.g., another calling VoIP client). Based on the priority information of the callee (called VoIP client) of the existing communication channel, at block 1406, a priority level corresponding to the first client and a priority level corresponding to the second client may be determined. At decision block 1408, a determination is made whether the second client has a higher priority level than the first VoIP client. If it is determined at decision block 1408 that the second VoIP client has a higher priority level, the service provider terminates, interrupts, or alters the existing communication channel at block 1410 and establishes a communication channel between the second VoIP client and the callee as illustrated at block 1412.

If it is determined at decision block 1408 that the second VoIP client does not have a higher priority level, the service provider may maintain the existing communication channel with the first VoIP client at block 1414. Alternatively, the service provider may determine appropriate actions based on contextual information of the call receiving party, or predefined rules by an authorized VoIP entity. For example, the receiving party may have indicated that several streams of voice packets can be received at the same time if there are several incoming calls. The service provider may multiplex voice data packets from the first VoIP client and the second VoIP client. In yet another example, the service provider may attach a particular indicator (e.g., a flag, etc.) to certain voice packets and transmit the received voice packets. The receiving party subsequently receives voice data packets and filters out those voice packets which include the particular indicator. It is contemplated that any authorized VoIP entity can specify how to handle several incoming streams of voice packets. The priority-based interrupting/terminating routine 1400 further continues to block 1416 where data packets transmitted from a calling client (e.g., first VoIP client, second VoIP client, etc.) with highest priority are transmitted to the callee. As such, if the first VoIP client has a higher priority than the second VoIP client, data packets transmitted from the first VoIP client will be transmitted to the callee over the existing communication channel at block 1416. Likewise, if the second VoIP client has a higher priority than the first VoIP client, data packets transmitted from the second VoIP client will be transmitted to the callee over the newly established communication channel at block 1416. The routine 1400 completes at block 1418

Figure 15A:
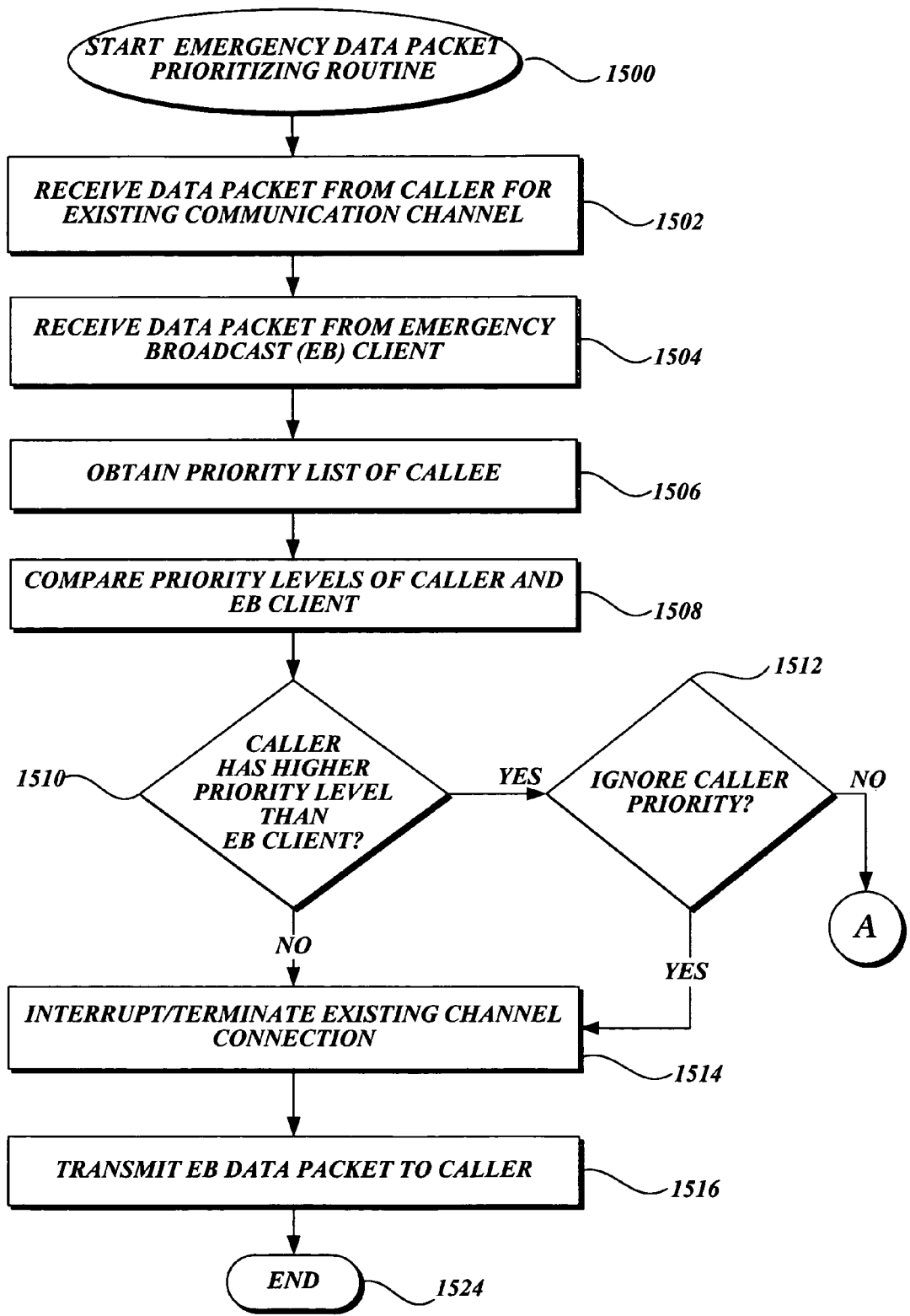
FIGS. 15A and 15B are flow diagrams of an emergency data packet prioritizing routine in accordance with an embodiment of the present invention.
Figure 15B:
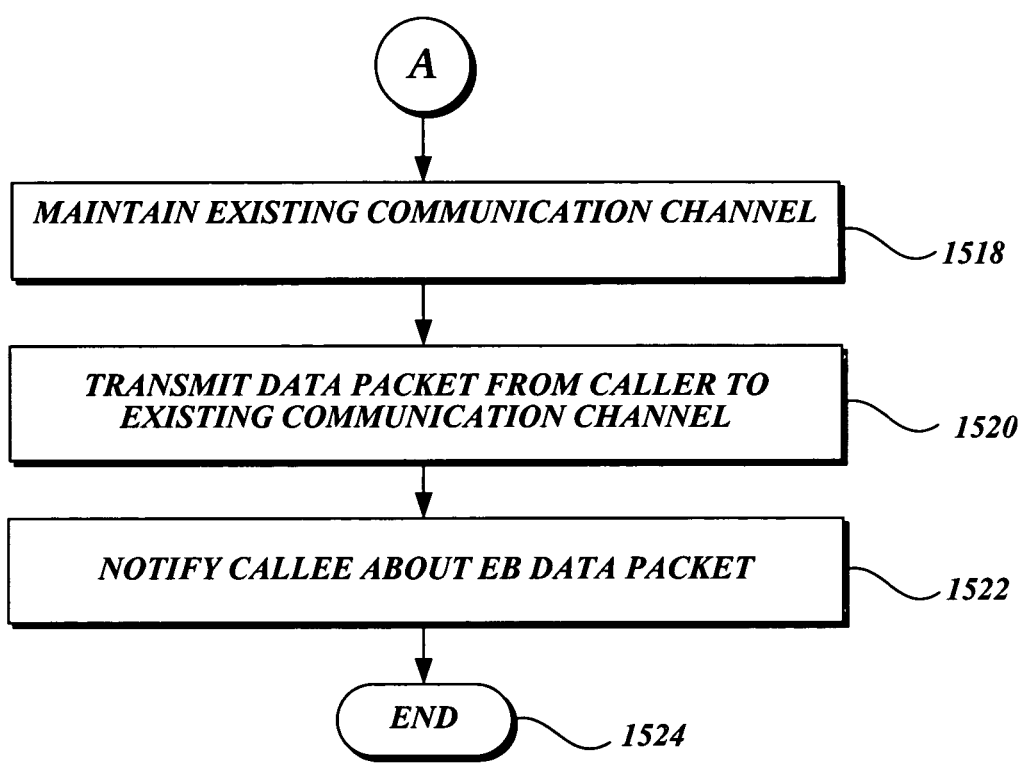

With reference to FIGS. 15A and 15B, flow diagrams illustrate an emergency data packet prioritizing routine 1500 in accordance with an embodiment of the present invention. In an illustrative embodiment, devices of a caller (calling VoIP client) and a callee (called VoIP client) may already have an existing communication channel. As described above, each service provider obtains contextual information of the caller and the callee during a conversation set-up phase or during a conversation. As with FIG. 14, the illustrative embodiment described herein will utilize the scenario in which the callee (called VoIP client) receives incoming calls from various VoIP clients. However, it is contemplated that both the caller and the callee can have incoming calls from various clients. It is further contemplated that, during a conversation set-up phase, received data packets from several calling VoIP clients will be prioritized. Additionally, the service provider of the callee can obtain priority information for incoming calls destined to the callee in order to determine priorities of incoming calls from multiple calling clients. Likewise, the service provider of the caller may obtain priority information for incoming calls destined to the caller. Each service provider may maintain a provider priority list for corresponding clients. Alternatively, a corresponding provider priority list may be obtained from a centralized repository that may be centrally managed by either public or private entities.

In this illustrative embodiment, the emergency data packet prioritizing routine 1500 starts from block 1502 where the service provider receives a data packet for an existing communication channel with the caller. At block 1504, the service provider also receives a data packet from an EB client. The service provider may obtain priority information (e.g., a priority list) from the callee at block 1506. The service provider determines corresponding priority for the caller and the EB client based on the priority information provided by the callee and possibly based on a priority list by the service provider. At block 1508, the service provider may compare the priority levels of the caller and the EB client. In one embodiment, an EB client can have multiple priority levels or sub-levels which may be determined based on information relating to an individual user of the EB client. For example, a manager of an EB client may have higher priority than an operator. In this example, the manager of an EB client can override a subset or all of contextual information provided by the operator of an EB. Likewise, the manager of an EB client can override a subset or all of the priority information provided by the operator of an EB. The routine 1500 continues to decision block 1510 to determine whether the caller has a higher priority than the EB client. If the caller does not have a higher priority level than the EB client, the service provider terminates, interrupts, or alters the existing communication channel at block 1514. The service provider transmits the EB data packet to the callee at block 1516. If it is determined at decision block 1510 that the caller does not have a higher priority level than the EB client, at decision block 1512, a determination is made as to whether the callee indicated that a higher priority caller can be ignored when there is an emergency situation. If it is determined that the callee has indicated that emergency data should be delivered in time by ignoring incoming calls from non-emergency calling client, the routine proceeds to block 1514 where the service provider terminates, interrupts or alters the existing communication channel. The service provider transmits EB data packets to the callee at block 1516. If it is determined that the callee has not indicated that incoming calls from non-emergency calling clients can be ignored in an emergency situation, the routine proceeds to terminal A (See FIG. 15B).

Referring to FIG. 15B, the routine continues to block 1518 where the service provider may maintain the existing communication channel. The data packets from the caller are transmitted to the existing communication channel at block 1520. At block 1522, the service provider notifies the callee of EB data packets. In one embodiment, the callee may specify how to be notified in case of emergency. The service provider may send a text message with an audio alarm, an e-mail message, a voice mail, or the like, to the callee while maintaining the existing communication channel. Alternatively, the callee may be given a choice to accept the EB data packets or continue with the existing communication channel. The callee may terminate the existing communication channel to accept the EB data packets. After transmitting the EB data packets (block 1516), or notifying EB data packets (block 1522), the routine 1500 completes at block 1524.

While illustrative embodiments have been illustrated and described, it will be appreciated that various changes can be made therein without departing from the spirit and scope of the invention.

The invention claimed is:

1. A method for transmitting data packets comprising:
   establishing a communication channel between a first client and a second client;
   receiving a second client data packet from the second client that is directed to the first client for the communication channel between the first client and the second client;
   receiving a third client data packet from a third client that is directed to the first client, wherein the third client is an emergency broadcast client with an emergency broadcast message to Voice Over Internet Protocol (VoIP) clients in a specific geographic area;
   determining a priority level for the second client data packet and the third client data packet based on both priority information obtained from the first client and a type of data packet;
   obtaining a priority list including priority information corresponding to the second client and the third client for use in determining the priority level of the data packets;
   when the second client does not have a lower priority level than the third client, determining whether the first client has indicated to ignore the priority level of the second client upon receipt of the data packet from the third client;
   determining a highest priority level data packet between the second client data packet and the third client data packet; and
   transmitting the highest priority level data packet to the first client.

2. The method of claim 1, further comprising:
   when the second client has a lower priority level than the third client, interrupting the existing communication channel between the first client and the second client.

3. The method of claim 1, further comprising:
   when the first client has indicated to ignore the priority level of the second client, interrupting the existing communication channel between the first client and the second client and assigning a higher priority level to the data packet received from the third client than the data packet received from the second client.

4. The method of claim 1, further comprising:
   when the first client has not indicated to ignore the priority level of the second client in case of emergency, maintaining the existing channel connection between the first client and the second client and notifying the first client about the data packet received from the third client.

5. The method of claim 1, wherein the third client is a caller requesting to initiate a communication channel with the first client.

6. The method of claim 5, further comprising:
   when the third client has a higher priority level than the second client, terminating the existing communication channel between the first client and the second client and establishing a communication channel between the first client and the third client.

7. The method of claim 5, further comprising:
   when the third client does not have a higher priority level than the second client, maintaining the existing communication channel between the first client and the second client.

8. The method of claim 5, further comprising:
   when the third client has a higher priority level than the second client, interrupting the existing communication channel between the first client and the second client for a predetermined time period and establishing a communication channel connection between the first and the third client.

9. The method of claim 8, further comprising:
   terminating the existing communication channel between the first client and the second client after the predetermined time period.

10. A computer-readable memory device used in transmitting data packets, comprising:
    establishing a communication channel between a first client and a second client;
    receiving a second client data packet from the second client that is directed to the first client for the communication channel between the first client and the second client;
    receiving a third client data packet from a third client that is directed to the first client, wherein the third client is an emergency broadcast client with an emergency broadcast message to Voice Over Internet Protocol (VoIP) clients in a specific geographic area;
    determining a priority level for the second client data packet and the third client data packet based on both priority information obtained from the first client and a type of data packet;
    obtaining a priority list including priority information corresponding to the second client and the third client for use in determining the priority level of the data packets;
    when the second client does not have a lower priority level than the third client, determining whether the first client has indicated to ignore the priority level of the second client upon receipt of the data packet from the third client;
    determining a highest priority level data packet between the second client data packet and the third client data packet; and
    transmitting the highest priority level data packet to the first client.

11. The computer-readable memory device of claim 10, further comprising:
    when the second client has a lower priority level than the third client, interrupting the existing communication channel between the first client and the second client.

12. The computer-readable memory device of claim 10, further comprising: when the first client has indicated to ignore the priority level of the second client, interrupting the existing communication channel between the first client and the second client and assigning a higher priority level to the data packet received from the third client than the data packet received from the second client.

13. The computer-readable memory device of claim 10, further comprising: when the first client has not indicated to ignore the priority level of the second client in case of emergency, maintaining the existing channel connection between the first client and the second client and notifying the first client about the data packet received from the third client.

14. The computer-readable memory device of claim 10, further comprising:
    when the third client has a higher priority level than the second client, terminating the existing communication channel between the first client and the second client and establishing a communication channel between the first client and the third client.

15. The computer-readable memory device of claim 14, further comprising: when the third client does not have a higher priority level than the second client, maintaining the existing communication channel between the first client and the second client.

16. The computer-readable memory device of claim 10, further comprising: when the third client has a higher priority level than the second client, interrupting the existing communication channel between the first client and the second client for a predetermined time period and establishing a communication channel connection between the first and the third client.

17. The computer-readable memory device of claim 16, further comprising: terminating the existing communication channel between the first client and the second client after the predetermined time period.

18. A system for transmitting data packets, comprising:
a processor and a computer readable medium memory;
the processor configured to perform operations, comprising:
  establishing a communication channel between a first client and a second client;
  receiving a second client data packet from the second client that is directed to the first client for the communication channel between the first client and the second client;
  receiving a third client data packet from a third client that is directed to the first client, wherein the third client is an emergency broadcast client with an emergency broadcast message to Voice Over Internet Protocol (VoIP) clients in a specific geographic area;
  determining a priority level for the second client data packet and the third client data packet based on both priority information obtained from the first client and a type of data packet;
  obtaining a priority list including priority information corresponding to the second client and the third client for use in determining the priority level of the data packets;
  when the second client does not have a lower priority level than the third client, determining whether the first client has indicated to ignore the priority level of the second client upon receipt of the data packet from the third client;
  determining a highest priority level data packet between the second client data packet and the third client data packet; and
  transmitting the highest priority level data packet to the first client.

19. The system of claim 18, further comprising:
when the second client has a lower priority level than the third client, interrupting the existing communication channel between the first client and the second client.

20. The system of claim 18, further comprising: when the first client has indicated to ignore the priority level of the second client, interrupting the existing communication channel between the first client and the second client and assigning a higher priority level to the data packet received from the third client than the data packet received from the second client.

* * * * *